US012659399B2

(12) United States Patent
Kim et al.

(10) Patent No.: US 12,659,399 B2
(45) Date of Patent: Jun. 16, 2026

(54) METHOD FOR PROVIDING SCREEN BY USING FLEXIBLE DISPLAY, AND ELECTRONIC DEVICE SUPPORTING SAME

(71) Applicant: SAMSUNG ELECTRONICS CO., LTD., Suwon-si (KR)

(72) Inventors: Nayoung Kim, Suwon-si (KR); Seungnyun Kim, Suwon-si (KR); Yongsang Yun, Suwon-si (KR); Seo Lee, Suwon-si (KR); Youngsoo Chun, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 485 days.

(21) Appl. No.: 18/297,877

(22) Filed: Apr. 10, 2023

(65) Prior Publication Data

US 2023/0247130 A1    Aug. 3, 2023

Related U.S. Application Data

(63) Continuation of application No. PCT/KR2021/013111, filed on Sep. 27, 2021.

(30) Foreign Application Priority Data

Oct. 12, 2020    (KR) ........................ 10-2020-0131148

(51) Int. Cl.
*H04M 1/72454*      (2021.01)
*H04M 1/02*      (2006.01)
*H04M 1/72409*      (2021.01)

(52) U.S. Cl.
CPC ..... *H04M 1/72454* (2021.01); *H04M 1/0216* (2013.01); *H04M 1/0268* (2013.01);
(Continued)

(58) Field of Classification Search
CPC ........... H04M 1/72454; H04M 1/0216; H04M 1/0268; H04M 1/72409; H04M 2201/38;
(Continued)

(56) References Cited

U.S. PATENT DOCUMENTS

2003/0220988 A1*  11/2003  Hymel .................. G06F 9/4411
                                                                                     719/321
2007/0097014 A1*   5/2007  Solomon ............... G06F 1/1616
                                                                                     345/1.1

(Continued)

FOREIGN PATENT DOCUMENTS

CN          101950844 A       1/2011
EP          3 062 214         8/2016
(Continued)

OTHER PUBLICATIONS

Office Action dated Mar. 27, 2025 in Korean Patent Application No. 10-2020-0131148 and English-language translation.
(Continued)

*Primary Examiner* — Ankur Jain
(74) *Attorney, Agent, or Firm* — Nixon & Vanderhye, P.C.

(57)                ABSTRACT

An example electronic device includes a housing including a first housing, a second housing, and a third housing; a hinge part including a first hinge part and a second hinge part; a display including a first area arranged in the first housing, a second area arranged in the second housing, and a third area arranged in the third housing; at least one sensor; a communication module; a processor; and a memory, wherein the memory may store instructions that, when executed, cause the processor to: detect, through the at least one sensor, whether a state of the electronic device is changed from a first state or a second state to a third state in which the second housing is expanded by a predetermined angle or more with respect to the first housing and the third
(Continued)

housing centering on the hinge part; identify, through the communication module, whether an external electronic device has established communication with or is capable of establishing communication with the electronic device when it is detected that the state of the electronic device is changed to the third state; identify the type of an external electronic device based on identifying that an external electronic device that has established communication with or is capable of establishing communication with the electronic device; and display, through the first area, the second area, and the third area of the display, a screen corresponding to a first mode or a screen corresponding to a second mode different from the first mode, based on the type of the external electronic device.

20 Claims, 16 Drawing Sheets

(52) U.S. Cl.
CPC .... *H04M 1/72409* (2021.01); *H04M 2201/38* (2013.01); *H04M 2201/42* (2013.01)

(58) Field of Classification Search
CPC .......... H04M 2201/42; H04M 1/0214; H04M 1/0235; H04M 1/0241; H04M 1/0243; G09G 2340/0407; G09G 2340/0464; G09G 2356/00; G09G 3/035; G09G 2354/00; G06F 3/04817; G06F 2203/04803; G06F 1/1616; G06F 1/1624; G06F 1/1641; G06F 1/1652; G06F 3/0481; G06F 3/1423; G06F 1/1677; G06F 3/14; G06F 1/1683; G06F 3/0484; G09F 9/301
See application file for complete search history.

(56) References Cited

U.S. PATENT DOCUMENTS

| | | | | |
|---|---|---|---|---|
| 2011/0241998 A1* | 10/2011 | Mckinney | ........... | H04M 1/0247 |
| | | | | 345/204 |
| 2012/0050183 A1* | 3/2012 | Lee | ....................... | G06F 3/1423 |
| | | | | 345/3.1 |
| 2013/0265221 A1* | 10/2013 | Lee | .................... | H04N 21/4222 |
| | | | | 345/156 |
| 2014/0043259 A1* | 2/2014 | Park | ...................... | G06F 1/1618 |
| | | | | 345/173 |
| 2014/0295814 A1* | 10/2014 | Heo | .................... | G06F 13/4063 |
| | | | | 455/418 |
| 2016/0085319 A1* | 3/2016 | Kim | .................... | H04M 1/0268 |
| | | | | 345/156 |
| 2016/0132074 A1* | 5/2016 | Kim | ...................... | G06F 1/1652 |
| | | | | 345/173 |
| 2017/0229100 A1* | 8/2017 | Chun | ....................... | G09G 5/38 |
| 2019/0114133 A1* | 4/2019 | Park | ...................... | G06F 1/1616 |
| 2020/0076940 A1* | 3/2020 | Kim | ...................... | G06F 1/1656 |
| 2020/0177714 A1* | 6/2020 | Jung | .................. | H04M 1/0268 |
| 2020/0225706 A1* | 7/2020 | Jung | .................... | G06F 1/1677 |
| 2021/0048926 A1* | 2/2021 | Woo | ...................... | G06F 3/0447 |
| 2021/0089081 A1* | 3/2021 | Ro | ........................ | G06F 3/0487 |

FOREIGN PATENT DOCUMENTS

| | | |
|---|---|---|
| EP | 3 296 838 | 3/2018 |
| KR | 20140020128 A | 2/2014 |
| KR | 20140117150 A | 10/2014 |
| KR | 20150060278 A | 6/2015 |
| KR | 20160033507 A | 3/2016 |
| KR | 20160055646 A | 5/2016 |
| KR | 20180020737 A | 2/2018 |
| KR | 20190043015 A | 4/2019 |
| KR | 20190102743 A | 9/2019 |

OTHER PUBLICATIONS

International Search Report for PCT/KR2021/013111 mailed Jan. 5, 2022, 5 pages.
Written Opinion of the ISA for PCT/KR2021/013111 mailed Jan. 5, 2022, 4 pages.
Partial supplementary search report dated Jan. 4, 2024 in European Patent Application No. 21880346.8.
Extended Search Report dated Apr. 19, 2024 in European Patent Application No. 21880346.8.
Communication pursuant to Article 94(3) EPC in European Application No. 21880346.8.
Office Action dated Feb. 7, 2026 in Chinese Application No. 202180069541.8 with English translation.

* cited by examiner

METHOD FOR PROVIDING SCREEN BY USING FLEXIBLE DISPLAY, AND ELECTRONIC DEVICE SUPPORTING SAME

CROSS-REFERENCE TO RELATED APPLICATIONS

This application is a continuation of International Application No. PCT/KR2021/013111 designating the United States, filed on Sep. 27, 2021, in the Korean Intellectual Property Receiving Office and claims priority to Korean Patent Application No. 10-2020-0131148, filed on Oct. 12, 2020, in the Korean Intellectual Property Office, the disclosures of which are incorporated by reference herein in their entireties.

BACKGROUND

Field

The disclosure relates to a method for providing a screen using a flexible display and an electronic device supporting the same.

Description of Related Art

Electronic devices including various types of flexible displays have been developed thanks to the development of electronic technology. An electronic device including a flexible display may secure portability while providing a wide display.

Recently, research on electronic devices with a multi-foldable display in which the display may be folded several times has been conducted. An electronic device with a multi-foldable display may provide a wider display than an electronic device including a foldable display in which the display may be folded only once.

There is also ongoing research on various electronic devices including an extendable display (e.g., a slidable display or a rollable display) in addition to electronic devices including a foldable display.

SUMMARY

An electronic device including a flexible display provides a single wide display as the display extends, but does not properly provide a screen according to the extended state (e.g., folding state) of the display. Further, despite extension of the display, the electronic device with a flexible display provides a screen which does not consider the communication connection state with an external electronic device.

Various embodiments of the disclosure relate to a method for providing a screen using a flexible display based on a communication connection state with an external electronic device as the flexible display extends and an electronic device supporting the same.

Benefits of the disclosure are not limited to the foregoing, and other unmentioned benefits will be apparent from the following description.

According to various embodiments of the disclosure, an electronic device may include a housing including a first housing, a second housing, and a third housing, a hinge unit including a first hinge configured to rotate the first housing and the second housing and a second hinge configured to rotate the second housing and the third housing, a display including a first area disposed on the first housing, a second area disposed on the second housing, and a third area disposed on the third housing, at least one sensor, a communication module (e.g., including communication circuitry), at least one processor (e.g., including processing circuitry) operatively connected with the display, the at least one sensor, and the communication module, and a memory operatively connected with the at least one processor. The memory may store instructions that, are configured to, when executed, enable the at least one processor to detect a change of a state of the electronic device from a first state or a second state to a third state in which the second housing is unfolded about the hinge unit at a designated angle or more from the first housing and the third housing, through the at least one sensor, based on detecting the change of the state of the electronic device to the third state, identify whether an external electronic device is communicatively connected or communicatively connectable to the electronic device through the communication module, based on an external electronic device being communicatively connected or communicatively connectable to the electronic device, identify a type of the external electronic device, and display a screen corresponding to a first mode or a screen corresponding to a second mode different from the first mode, through the first area, the second area, and the third area of the display, based on the type of the external electronic device.

According to various embodiments of the disclosure, a method for providing a screen using a flexible display by an electronic device may include detecting a change of a state of the electronic device from a first state or a second state to a third state in which a second housing is unfolded about a hinge unit at a designated angle or more from a first housing and a third housing, through at least one sensor of the electronic device, based on the change of the state of the electronic device to the third state, identifying whether an external electronic device is communicatively connected or communicatively connectable to the electronic device through a communication module of the electronic device, based on an external electronic device being communicatively connected or communicatively connectable to the electronic device, identifying a type of the external electronic device, and displaying a screen corresponding to a first mode or a screen corresponding to a second mode different from the first mode, through a first area of the display, disposed on the first housing, a second area of the display, disposed on the second housing, and a third area of the display, disposed on the third housing, based on the type of the external electronic device.

According to various embodiments of the disclosure, an electronic device may include a housing, a display with an externally exposed area extendable according to movement through the housing, at least one sensor, a communication module (e.g., including communication circuitry), a processor (e.g., including processing circuitry) operatively connected with the display, the at least one sensor, and the communication module, and a memory operatively connected with the at least one processor. The memory may store instructions that, when executed, enable the at least one processor to detect external exposure of an area of the display by a designated area or more through the at least one sensor, based on detecting the external exposure of the area of the display by the designated area or more, identify whether an external electronic device is communicatively connected or communicatively connectable to the electronic device through the communication module, based on an external electronic device being communicatively connected or communicatively connectable to the electronic device, identify a type of the external electronic device, and display a screen corresponding to a first mode or a screen corresponding to a second mode different from the first mode through the display based on the type of the external electronic device.

According to various embodiments of the disclosure, the method for providing a screen using a flexible display and the electronic device supporting the same may provide a screen based on the communication connection state with an external electronic device as the flexible display extends and the size of the display varies.

BRIEF DESCRIPTION OF THE DRAWINGS

The above and other aspects, features and advantages of certain embodiments of the present disclosure will be more apparent from the following detailed description, taken in conjunction with the accompanying drawings, in which.

DETAILED DESCRIPTION

Figure 1:
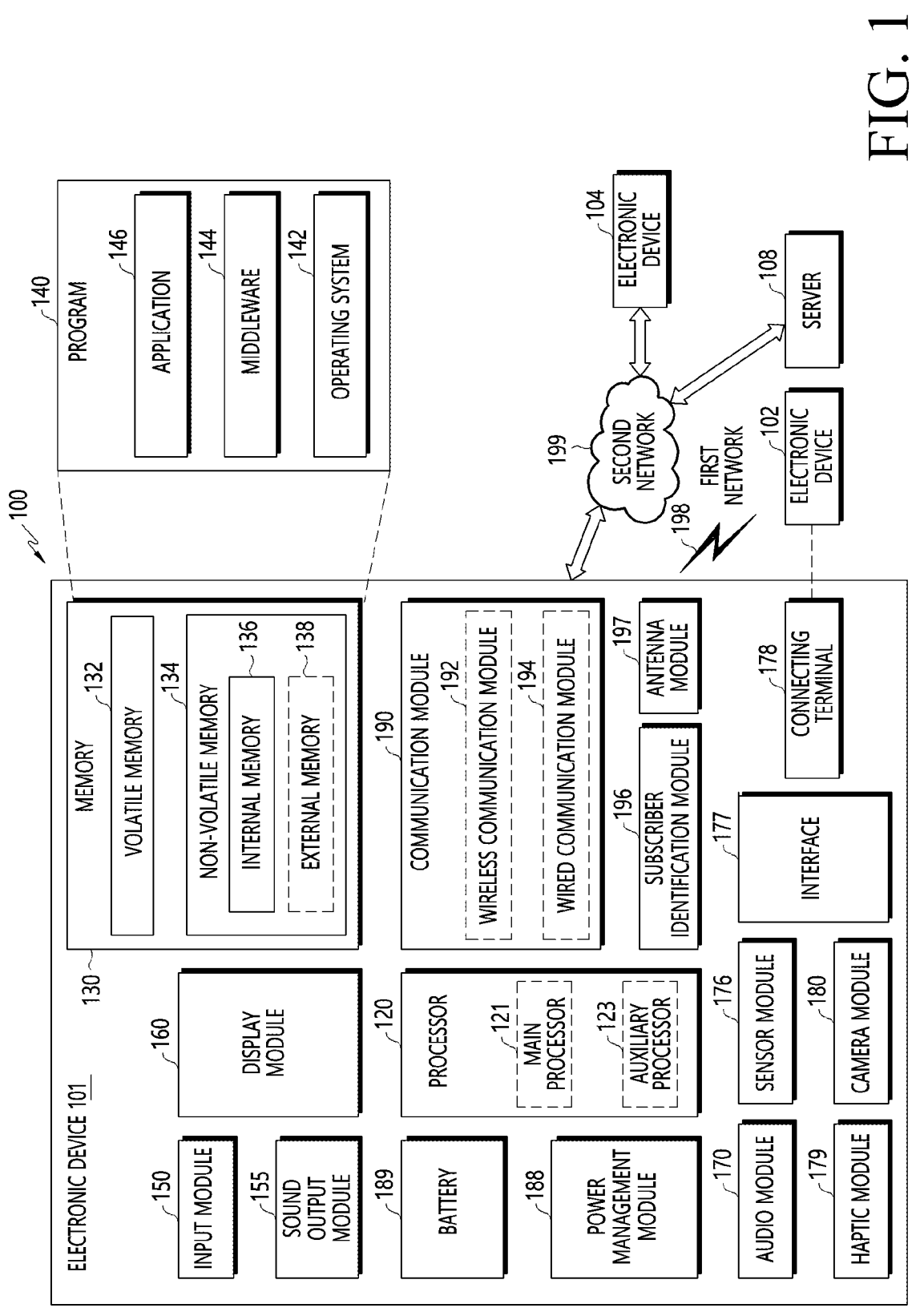
FIG. 1 illustrates an example electronic device in a network environment according to various embodiments.

FIG. 1 is a block diagram illustrating an example electronic device 101 in a network environment 100 according to various embodiments.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In various embodiments, at least one (e.g., the connecting terminal 178) of the components may be omitted from the electronic device 101, or one or more other components may be added in the electronic device 101. According to an embodiment, some (e.g., the sensor module 176, the camera module 180, or the antenna module 197) of the components may be integrated into a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be configured to use lower power than the main processor 121 or to be specified for a designated function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. The artificial intelligence model may be generated via machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by other component (e.g., the processor 120) of the electronic device 101, from the outside (e.g., a user) of the electronic device 101. The input module 150 may include, for example, a microphone, a mouse, a keyboard, keys (e.g., buttons), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display 160 may include, for example, a display, a hologram device, or a projector and control circuitry to control a corresponding one of the display, hologram device, and projector. According to an embodiment, the display 160 may include a touch sensor configured to detect a touch, or a pressure sensor configured to measure the intensity of a force generated by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or motion) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device 104 via a first network 198 (e.g., a short-range communication network, such as Bluetooth™, wireless-fidelity (Wi-Fi) direct, or infrared data association (IrDA)) or a second network 199 (e.g., a long-range communication network, such as a legacy cellular network, a 5G network, a next-generation communication network, the Internet, or a computer network (e.g., local area network (LAN) or wide area network (WAN)). These various types of communication modules may be implemented as a single component (e.g., a single chip), or may be implemented as multi components (e.g., multi chips) separate from each other. The wireless communication module 192 may identify or authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device). According to an embodiment, the antenna module 197 may include one antenna including a radiator formed of or including a conductor or conductive pattern formed on a substrate (e.g., a printed circuit board (PCB)). According to an embodiment, the antenna module 197 may include a plurality of antennas (e.g., an antenna array). In this case, at least one antenna appropriate for a communication scheme used in a communication network, such as the first network 198 or the second network 199, may be selected from the plurality of antennas by, e.g., the communication module 190. The signal or the power may then be transmitted or received between the communication module 190 and the external electronic device via the selected at least one antenna. According to an embodiment, other parts (e.g., radio frequency integrated circuit (RFIC)) than the radiator may be further formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. The external electronic devices 102 or 104 each may be a device of the same or a different type from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In an embodiment, the external electronic device 104 may include an Internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various embodiments of the disclosure may be one of various types of electronic devices. The electronic devices may include, for example, a portable communication device (e.g., a smartphone), a computer device, a portable multimedia device, a portable medical device, a camera, a wearable device, a home appliance, or the like. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used herein, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium, where the term "non-transitory" refers, for example, to a storage medium that may be a tangible device, and does not include a signal (e.g., an electromagnetic wave), but this term does not differentiate between where data is semi-permanently stored in the storage medium and where the data is temporarily stored in the storage medium.

A method according to various embodiments of the disclosure may be included and provided in a computer program product. The computer program products may be traded as commodities between sellers and buyers. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smartphones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. Some of the plurality of entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
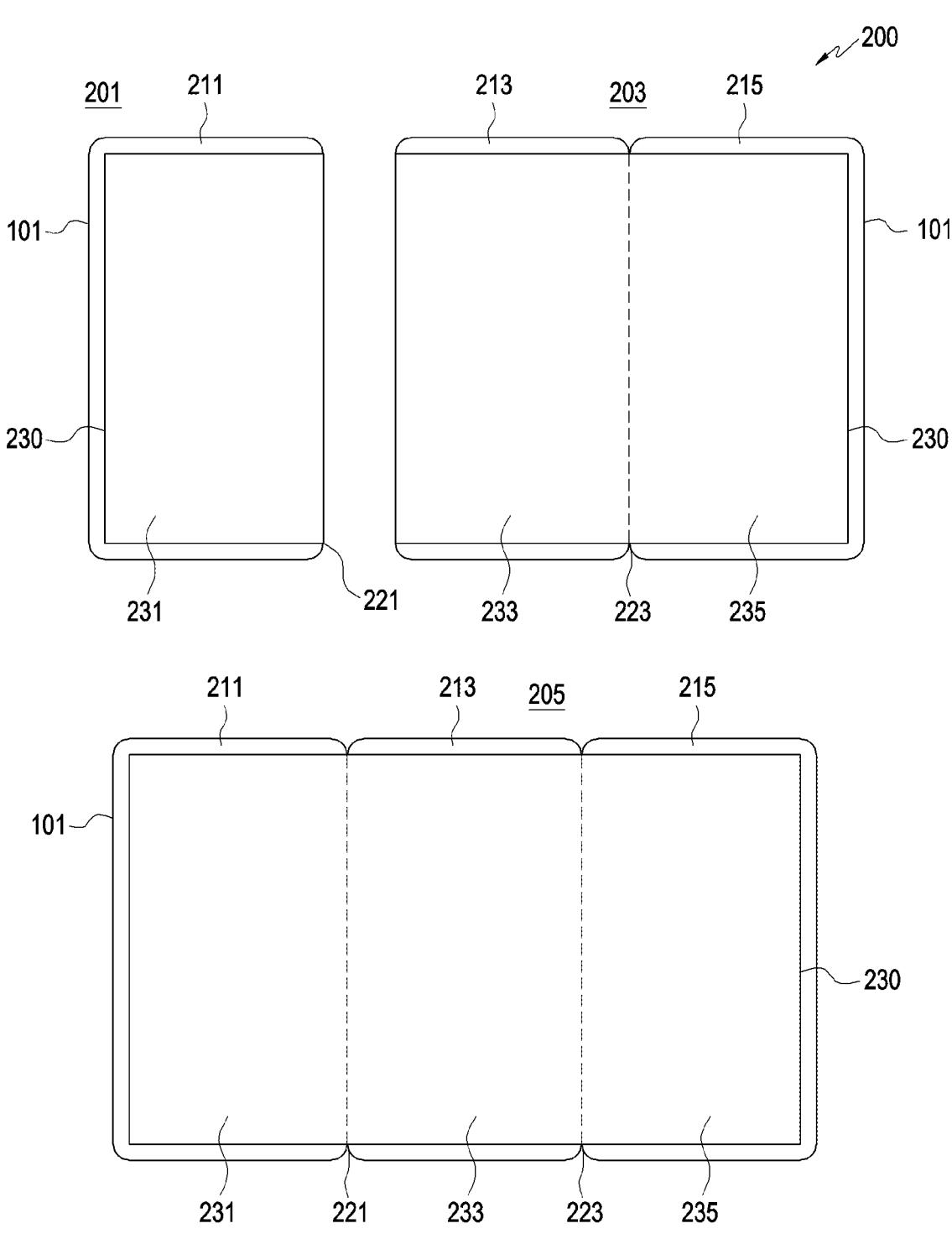
FIG. 2 is a diagram illustrating an electronic device according to various embodiments.

FIG. 2 is a diagram 200 illustrating an electronic device 101 according to various embodiments.

Referring to FIG. 2, in an embodiment, an electronic device 101 may include a first housing 211, a second housing 213, a third housing 215, a first hinge unit 221, a second hinge unit 223, and a display 230. In an embodiment, the first housing 211, the second housing 213, and the third housing 215 may be denoted as housings, and the first hinge unit 221 and the second hinge unit 223 may be denoted as hinge units or hinges. In an embodiment, although not shown in FIG. 2, the electronic device 101 may further include at least one of the components shown in FIG. 1.

In an embodiment, the first housing 211 and the second housing 213 may be connected to each other. For example, one side surface of the first housing 211 and one side surface of the second housing 213 may be connected. In an embodiment, the first housing 211 and the second housing 213 may be connected by the first hinge unit 221. For example, the first housing 211 and the second housing 213 may be connected rotatably or pivotably around (e.g., about) the first hinge unit 221. In an embodiment, the first housing 211 and the second housing 213 may be rotated so that a first surface of the first housing 211 and a first surface of the second housing 213 change from facing in opposite directions to facing in the same direction or change from facing in the same direction to facing in opposite directions.

In an embodiment, the second housing 213 and the third housing 215 may be connected. For example, one side surface of the second housing 213 and one side surface of the third housing 215 may be connected. In an embodiment, the second housing 213 and the third housing 215 may be connected by the second hinge unit 223. For example, the second housing 213 and the third housing 215 may be connected rotatably or pivotably around second hinge unit 223. In an embodiment, the second housing 213 and the third housing 215 may be rotated so that a first surface of the second housing 213 and a first surface of the third housing 215 change from facing in opposite directions to facing in the same direction or change from facing in the same direction to facing in opposite directions.

In an embodiment, the display 230 may be visually exposed to the outside through the first housing 211, the second housing 213, and the third housing 215. For example, the display 230 may be disposed in the first housing 211, the second housing 213, and the third housing 215 across the first hinge portion 221 and the second hinge portion 223. The display 230 may include a first area 231 disposed in the first housing 211, a second area 233 disposed in the second housing 213, and a third area 235 disposed in the third housing 215.

In an embodiment, the display 230 may be a foldable display. In an embodiment, as the first housing 211 and the second housing 213 are rotated about the first hinge unit 221, the display 230 may be folded in an out-folding manner in which the first area 231 and the second area 233 change from facing in the same direction to facing in opposite directions (e.g., the first area 231 and the second area 233 face away from each other, rather than facing each other). In an embodiment, when the second housing 213 and the third housing 215 are rotated about the second hinge unit 223, the display 230 may be folded an in-folding manner in which the second area 233 and the third area 235 change from facing in the same direction to facing each other.

Although FIGS. 2 to 9 illustrate examples of folding or unfolding of the display 230, embodiments of the disclosure are not limited thereto. For example, the display 230 may be implemented to be bendable (or warpable), and examples in which the display 230 is implemented in a bendable form may be described in the same or similar manner to the examples in which the display 230 is folded or unfolded.

In an embodiment, 201 may indicate a state of the electronic device 101 in which the first area 231 of the display 230 faces in the direction opposite to the direction in which the second area 233 of the display 230 faces (e.g., the first area 231 and the second area 233 do not face each other but face in opposite directions), and the second area 233 and the third area 235 of the display 230 face each other. Hereinafter, the state (e.g., folding state or posture) of the electronic device 101 as indicated by 201 may, for example, be denoted as a "first state of the electronic device 101" (or "first state"). In the first state of the electronic device 101, the first area 231 of the display 230 may be visually exposed to the outside, and the second area 233 and third area 235 of the display 230 may not be visually exposed to the outside.

In an embodiment, the first state of the electronic device 101 is not limited to the state of the electronic device indicated by 201. In an embodiment, the first state of the electronic device 101 may include a state of the electronic device 101, in which the first area 231 of the display 230 faces in the same direction as the direction in which the second area 233 of the display 230 faces, and the second area 233 and third area 235 of the display 230 face each other. For example, the first state of the electronic device 101 may include a state of the electronic device 101, in which the first housing 211 and the second housing 213 are unfolded about the first hinge unit 221, and the second housing 213 and the third housing 215 are fully folded about the second hinge unit 223.

In an embodiment, 203 may indicate a state of the electronic device 101, in which the first area 231 of the display 230 faces in the direction opposite to the direction in which the second area 233 of the display 230 faces, and the second area 233 and third area 235 of the display 230 face in the same direction. Hereinafter, the state of the electronic device 101 indicated by 203 may, for example, be denoted as a "second state of the electronic device 101" (or "second state").

In an embodiment, 205 may indicate a state of the electronic device 101 in which the first area 231, second area 233, and third area 235 of the display 230 face in the same direction. Hereinafter, the state of the electronic device 101 as indicated by 205 may, for example, be denoted as a "third state of the electronic device 101" (or "third state").

In an embodiment, the third state of the electronic device 101 is not limited to the state of the electronic device indicated by 205. In an embodiment, the third state of the electronic device 101 may include a state in which the first housing 211 and the second housing 213 are at a designated first angle or more (or within a designated first angle range) about the first hinge unit 221, and the second housing 213 and the third housing 215 are unfolded at a designated second angle or more about the second hinge unit 223, as the state of the electronic device 101 of FIG. 9 described below.

Figure 3:
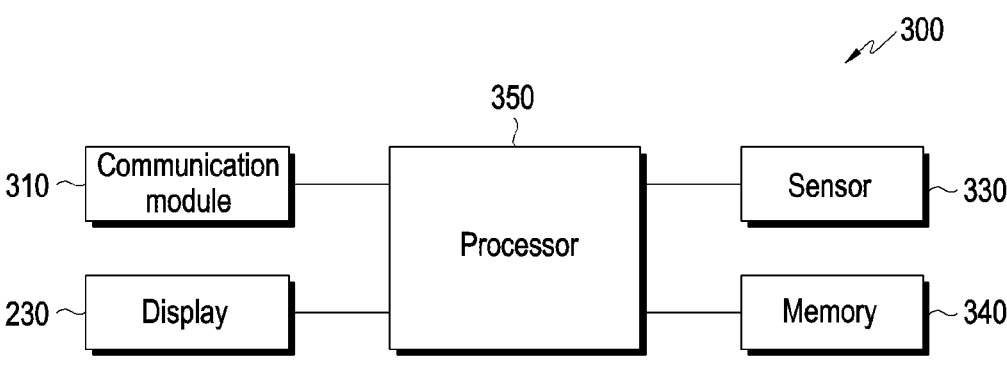
FIG. 3 is a block diagram illustrating an example electronic device according to various embodiments.

FIG. 3 is a block diagram 300 illustrating an example electronic device 101 according to various embodiments.

Referring to FIG. 3, in an embodiment, an electronic device 101 may include a communication module 310, a display 230, a sensor 330, a memory 340, and a processor 350. Although not shown in FIG. 3, the electronic device 101 may further include a housing and a hinge unit as shown in FIG. 2.

In an embodiment, the communication module 310 (e.g., including communication circuitry) may communicatively connect the electronic device 101 and an external electronic device. For example, the communication module may com-municatively connect the electronic device 101 and the external electronic device wiredly or wirelessly.

In an embodiment, the communication module 310 may be at least partially the same as or similar to the communi-cation module 190 of FIG. 1 and thus the description thereof is not repeated below in detail.

In an embodiment, the display 230 is the same as the display 230 of FIG. 2, and thus a detailed description of the display 230 is not repeated.

In an embodiment, the sensor 330 may include a sensor (hereinafter, referred to as a "first sensor") for detecting the state (e.g., a folding state or posture) and folding angle of the electronic device 101. For example, the first sensor may detect the first state, the second state, and the third state of the electronic device 101. As another example, the first sensor may detect a folding angle formed by the first housing 211 and the second housing 213 (e.g., the angle between the first housing 211 and the second housing 213 about the axis of the first hinge unit 221) and a folding angle formed by the second housing 213 and the third housing 215 (e.g., the angle between the second housing 213 and the third housing 215 about the axis of the second hinge unit 223). In an embodiment, the first sensor may include at least one of a hall sensor, a proximity sensor, an angle sensor, a load cell, an infrared sensor, a pressure sensor, an acceleration sensor, a gyro sensor, or an electromagnetic sensor. However, the sensor for detecting the state and folding angle of the electronic device 101 is not limited to the above-described first sensor. In an embodiment, when the first sensor includes a plurality of sensors, the plurality of sensors may be disposed in the first housing 211, the second housing 213, and the third housing 215, respectively.

In an embodiment, the sensor 330 may include a sensor (hereinafter, referred to as a "second sensor") for detecting reception of an electronic pen in the electronic device 101 or separation (e.g., detachment) of the electronic pen from the electronic device 101. For example, the second sensor may include a sensor (e.g., a magnetic field sensor or coil sensor) capable of detecting a change in magnetic field induced by the coil (e.g., a charging coil) included in the electronic pen when the electronic pen is received (or attached) in or separated from the electronic device 101. As an example, the second sensor may include a sensor (e.g., hall sensor) capable of detecting whether the magnet included in the electronic pen is attached when the electronic pen is attached to the electronic device 101 or separated from the electronic device 101.

According to an embodiment, the memory 340 may be included in the memory 130 of FIG. 1. In an embodiment, the memory 340 may store information for performing operations related to a method for providing a screen.

According to an embodiment, the processor 350 (e.g., including processing circuitry) may be included in the processor 120 of FIG. 1.

In an embodiment, the processor 350 may perform opera-tions related to a method for providing a screen using a flexible display (e.g., the display 230).

Hereinafter, examples related to operations of the proces-sor 350 are described in detail with reference to FIGS. 4 to 9.

According to various example embodiments of the dis-closure, an electronic device 101 may include a housing including a first housing 211, a second housing 213, and a third housing 215, a hinge unit including a first hinge unit 221 configured to rotate the first housing 211 and the second housing 213 and a second hinge unit 223 configured to rotate the second housing 213 and the third housing 215, a display 230 including a first area 231 disposed on the first housing 211, a second area 233 disposed on the second housing 213, and a third area 235 disposed on the third housing 215, at least one sensor 330, a communication module 310, at least one processor 350 operatively connected with the display 230, the at least one sensor 330, and the communication module 310, and a memory 340 operatively connected with the processor 350. The memory 340 may store instructions that, are configured to, when executed, enable the processor 350 to detect a change of a state of the electronic device 101 from a first state or a second state to a third state in which the second housing is unfolded about the hinge unit at a designated angle or more from the first housing and the third housing, through the at least one sensor 330, upon detecting the change of the state of the electronic device 101 to the third state, identify whether there is an external electronic device communicatively connected or communicatively connectable to the electronic device 101 through the communication module 310, when there is the external electronic device communicatively connected or communicatively connectable to the electronic device 101, identify a type of the external electronic device, and display a screen corresponding to a first mode or a screen corresponding to a second mode different from the first mode, through the first area 231, the second area 233, and the third area 235 of the display 230, based on the type of the external electronic device.

According to various embodiments, the instructions may enable the processor 350 to, when the type of the external electronic device is an external input device, display the screen corresponding to the second mode through the first area 231, the second area 233, and the third area 235 of the display 230.

According to various embodiments, the instructions may be configured to enable the processor 350 to, when the type of the external electronic device is the external input device, and an input for displaying the screen corresponding to the second mode is received, display the screen corresponding to the second mode, through the first area 231, the second area 233, and the third area 235 of the display 230.

According to various embodiments, the instructions may be configured to enable the processor 350 to, when the external electronic device communicatively connected to the electronic device 101 is absent, or a designated external electronic device is not communicatively connected to the electronic device 101, display the screen corresponding to the first mode through the first area 231, the second area 233, and the third area 235 of the display 230.

According to various embodiments, the instructions may be configured to enable the processor 350 to, upon detecting the change of the state of the electronic device 101 to the third state, identify the external electronic device communicatively connectable to the electronic device 101 through the communication module 310 and communicatively connect the external electronic device to the electronic device 101 through the communication module 310.

According to various embodiments, the instructions may be configured to enable the processor 350 to detect a change of the state of the electronic device 101 to an unfolded state in which the first housing 211 and the second housing 213 are at a designated first angle or more about the first hinge unit, and the second housing 213 and the third housing 215 are unfolded about the second hinge unit at a designated second angle or more through the at least one sensor 330, upon detecting the change of the state of the electronic device 101 to the unfolded state, identify whether there is an external electronic device communicatively connected to the electronic device 101 through the communication module 310, when there is the external electronic device communicatively connected to the electronic device 101, identify a type of the external electronic device, and display the screen corresponding to the first mode or the screen corresponding to the second mode different from the first mode, through the second area 233 and the third area 235 of the display 230, based on the type of the external electronic device.

According to various embodiments, the first state may be a state in which the first area 231 faces in a direction opposite to a direction in which the second area 233 faces, and the second area 233 and the third area 235 face each other, and the second state may be a state in which the first area 231 faces in the direction opposite to the direction in which the second area 233 faces, and the second area 233 and the third area 235 face in the same direction. The instructions may be configured to enable the processor 350 to display a plurality of first icons through the first area 231 in the first state, detect a change of the state of the electronic device 101 from the first state to the second state through the at least one sensor 330 and display a plurality of second icons at a second resolution higher than a first resolution of the plurality of first icons or display the plurality of second icons arranged by a distance longer than a distance between the plurality of first icons, through the second area 233 and the third area 235, in the second state.

According to various embodiments, the screen corresponding to the first mode may include a plurality of third icons, different from the plurality of first icons and the plurality of second icons, and an icon corresponding to an application related to the external electronic device.

According to various embodiments, the first mode may be a tablet mode, and the second mode may be a desktop mode.

Figure 4:
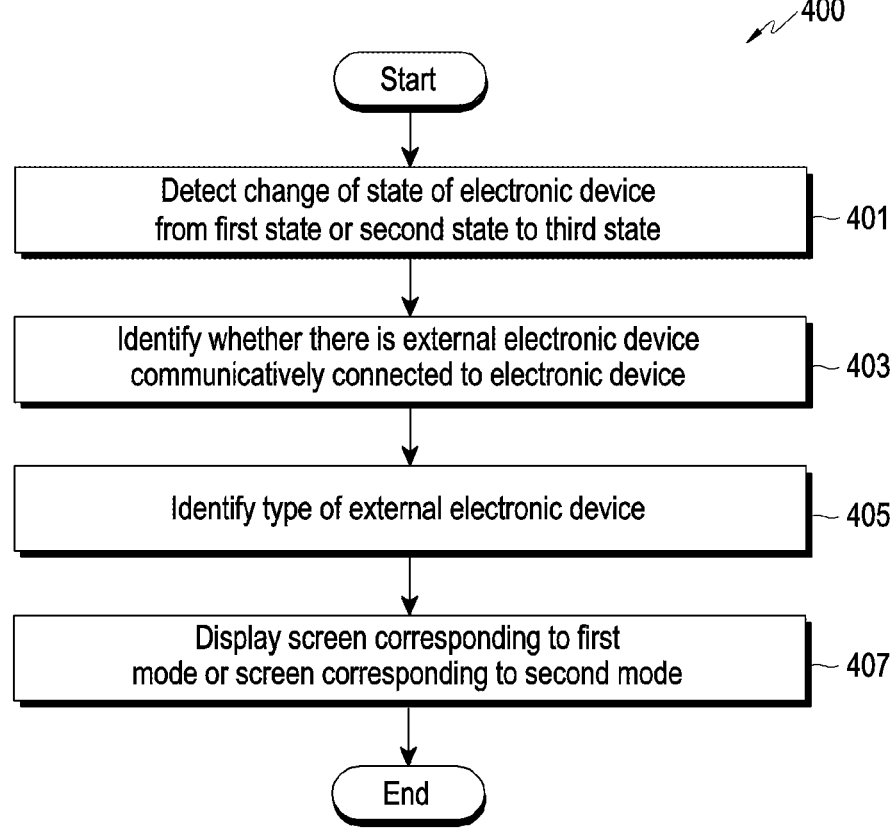
FIG. 4 is a flowchart illustrating an example method for providing a screen using a flexible display according to various embodiments.

FIG. 4 is a flowchart 400 illustrating an example method for providing a screen using a flexible display according to various embodiments.

Referring to FIG. 4, in operation 401, in an embodiment, the processor 350 may detect, through the (first) sensor 330, a change (or switch) of the state (e.g., folding state or posture) of the electronic device 101 from a first state or second state to a third state.

In an embodiment, the processor 350 may detect a change of the state of the electronic device 101 from the first state to the second state and then a change from the second state to the third state, through the first sensor.

In an embodiment, the processor 350 may detect an immediate change of the state of the electronic device 101 from the first state to the third state through the first sensor. For example, the processor 350 may detect, through the first sensor, that the second housing 213 and the third housing 215 are unfolded about the second hinge unit 223 simultaneously with, or within a designated time from when, the first housing 211 and the second housing 213 are unfolded about the first hinge unit 221 from the first state of the electronic device 101 in which the first area 231 of the display 230 faces in the direction opposite to the direction in which the second area 233 of the display 230 faces, and the second area 233 and third area 235 of the display 230 face each other (or a state of the electronic device 101 in which the first area 231 of the display 230 faces in the same direction as the direction in which the second area 233 of the display 230 faces and the second area 233 and third area 235 of the display 230 face each other).

Although not shown in FIG. 4, in an embodiment, when the state of the electronic device 101 changes from the first state to the second state, the processor 350 may change the screen configuration (or screen settings) displayed through the display 230. For example, in the first state of the electronic device 101, the processor 350 may display a first screen using the screen configuration corresponding to the first state of the electronic device 101 through the display 230 (e.g., the first area 231 of the display 230) (hereinafter, the screen displayed in the first state of the electronic device 101 is, for example, denoted as a "first screen"). When the state of the electronic device 101 changes from the first state to the second state while the first screen is displayed, the processor 350 may display a second screen using the screen configuration corresponding to the second state of the electronic device 101 through the display 230 (e.g., the second area 233 and the third area 235 of the display 230) (hereinafter, the screen displayed in the second state of the electronic device 101 is, for example, denoted as a "second screen").

In an embodiment, the processor 350 may display the first screen including a plurality of first icons using a first screen configuration (e.g., arranged in a first array structure) through the display 230 (e.g., the first area 231). When the state of the electronic device 101 changes from the first state to the second state, the processor 350 may display a plurality of second icons which result from a change in the display of the plurality of first icons, using a second screen configuration (e.g., arranged in a second array structure), through the display 230 (e.g., the second area 233 and the third area 235). For example, the processor 350 may display the plurality of second icons having a second resolution (e.g., dots per inch (DPI) or pixel per inch (PPI)) higher than a first resolution of the plurality of first icons through the display 230 (e.g., the second area 233 and the third area 235). As an example, the processor 350 may display the plurality of second icons arranged in a longer distance than the distance between the plurality of first icons through the display 230 (e.g., the second area 233 and the third area 235). However, the first screen and the second screen are not limited to the above-described examples, and are described below in detail with reference to FIG. 5A.

In an embodiment, the processor 350 may detect that the state of the electronic device 101 changes (or switches) from an intermediate state (e.g., a state between the first state and the second state or a state between the second state and the third state) to the third state. Hereinafter, a change from the first state or second state to the third state may include a change from the intermediate state to the third state.

In operation 403, in an embodiment, the processor 350 may identify whether an external electronic device communicatively connected to the electronic device 101 is present (exists) through the communication module 310.

In an embodiment, when the state of the electronic device 101 changes from the first state or second state to the third state, the processor 350 may identify whether an external electronic device communicatively connected to the electronic device 101 is present through the communication module 310.

In an embodiment, the processor 350 may identify whether an external electronic device communicatively connected to the electronic device 101 is present through the short-range wireless communication module 310. In an embodiment, the processor 350 may identify whether an external electronic device communicatively connected to the electronic device 101 is present through the wired communication module 194.

In operation 405, in an embodiment, when it is identified that an external electronic device communicatively connected to the electronic device 101 is present, the processor 350 may identify the type of the external electronic device.

In an embodiment, the processor 350 may identify the type of the external electronic device communicatively connected to the electronic device 101, thereby identifying, for example, whether the external electronic device is a designated external electronic device. For example, the processor 350 may identify whether the external electronic device communicatively connected to the electronic device 101 is at least one of a keyboard, a mouse, a speaker, an earset, or an electronic pen. However, the operation of identifying whether the external electronic device communicatively connected to the electronic device 101 is a designated external electronic device may be omitted.

In an embodiment, the processor 350 may further perform the operation of identifying whether the electronic pen is detached (e.g., separated) from the electronic device 101 through the second sensor.

However, the external electronic device communicatively connected to the electronic device 101 is not limited to the above-described examples.

In operation 407, the processor 350 may display a screen corresponding to a first mode or a screen corresponding to a second mode, different from the first mode, through the display 230 (e.g., the first area 231, the second area 233, and the third area 235) based on the type of the external electronic device communicatively connected to the electronic device 101.

In an embodiment, the first mode may be a mode in which input to the electronic device 101 may be performed based on touch. For example, the first mode may be a mode in which input to the electronic device 101 may be performed based on a touch to the display 230 with the user's finger (or electronic pen). However, without limitations thereto, even in the first mode, an input to the electronic device 101 may be performed through an external input device (e.g., keyboard or mouse).

In an embodiment, the first mode may be a mode in which, when an application is executed, the execution screen of the application is displayed through the entire area of the display 230 (e.g., all of the first area 231, the second area 233, and the third area 235).

In an embodiment, the first mode may be referred to as a tablet mode.

In an embodiment, the second mode may be a mode in which input to the electronic device 101 may be performed through an external electronic device (e.g., external input device) communicatively connected to the electronic device 101. For example, the second mode may be a mode in which input to the electronic device 101 may be performed through at least one of a keyboard or mouse communicatively connected to the electronic device 101. However, without limitations thereto, in the second mode, input to the electronic device 101 may be performed by touch as well as by the external electronic device.

In an embodiment, the second mode may be a mode for displaying a screen to provide a personal computer (PC) environment (or PC experience). For example, the second mode may be a mode for displaying the execution screen of an application using a window when the application is executed.

In an embodiment, the second mode may, for example, be denoted as a desktop mode or dex mode.

In an embodiment, when there is no external electronic device communicatively connected to the electronic device 101 (e.g., when there is a designated external electronic device communicatively connected to the electronic device 101), the processor 350 may display a screen using the third screen configuration corresponding to the first mode, through the display 230 (e.g., the first area 231, the second area 233, and the third area 235) (hereinafter, the screen displayed in the first mode is, for example, denoted as a "third screen").

In an embodiment, when the external electronic device communicatively connected to the electronic device 101 is at least one of an electronic pen, a speaker, or an earset, the processor 350 may display the third screen through the display 230 (e.g., the first area 231, the second area 233, and the third area 235). For example, the processor 350 may display a third screen including a plurality of third icons, different from the plurality of first icons included in the first screen and the plurality of second icons included in the second screen, through the display 230.

In an embodiment, upon detecting detachment of the electronic pen from the electronic device 101, the processor 350 may display the third screen through the display 230.

In an embodiment, the third screen displayed in the first mode may include the execution screen of the application displayed through the entire area (e.g., all of the first area 231, the second area 233, and the third area 235) of the display 230 when the application is executed. Examples of the third screen displayed in the first mode are described below in detail with reference to FIGS. 5B and 5C.

In an embodiment, when the external electronic device communicatively connected to the electronic device 101 is at least one of a keyboard or a mouse, the processor 350 may display a screen using a fourth screen configuration corresponding to the second mode through the display 230 (hereinafter, the screen displayed in the second mode is, for example, denoted as a "fourth screen"). In an embodiment, the fourth screen may be a screen to provide a PC environment. For example, the fourth screen may include the execution screen of the application displayed using a window when the application is executed. Examples of the fourth screen displayed in the second mode are described below in detail with reference to FIG. 5B.

In an embodiment, upon identifying that the external electronic device communicatively connected to the electronic device 101 is at least one of a keyboard or a mouse, the processor 350 may display the fourth screen corresponding to the second mode through the display 230 in response to reception of an additional input. For example, when the external electronic device communicatively connected to the electronic device 101 is a keyboard, the processor 350 may display the fourth screen corresponding to the second mode through the display 230 in response to reception of an input to a designated key from the keyboard, as the additional input. As an example, when the external electronic device communicatively connected to the electronic device 101 is a mouse, the processor 350 may display the fourth screen corresponding to the second mode through the display in response to reception of a designated input from the mouse (e.g., a single click, double click, or long click input through the mouse) as the additional input. As an example, the processor 350 may display a first object (e.g., icon) for displaying the third screen corresponding to the first mode and a second object for displaying the fourth screen corresponding to the second mode, through the display 230. The processor 350 may display the fourth screen corresponding to the second mode through the display 230 based on an input for selecting one of the second objects. As an example, the processor 350 may display an object for switching (e.g., toggling) between the third screen corresponding to the first mode and the fourth screen corresponding to the second mode through the display 230. The processor 350 may display the fourth screen corresponding to the second mode through the display 230 based on an input to the object.

In an embodiment, even when it is identified that the external electronic device communicatively connected to the electronic device 101 is at least one of a keyboard or a mouse, the fourth screen corresponding to the second mode is displayed in response to reception of an additional input, preventing display of the fourth screen corresponding to the second mode in a context where the user does not desire to display the fourth screen corresponding to the second mode.

Figure 5A:
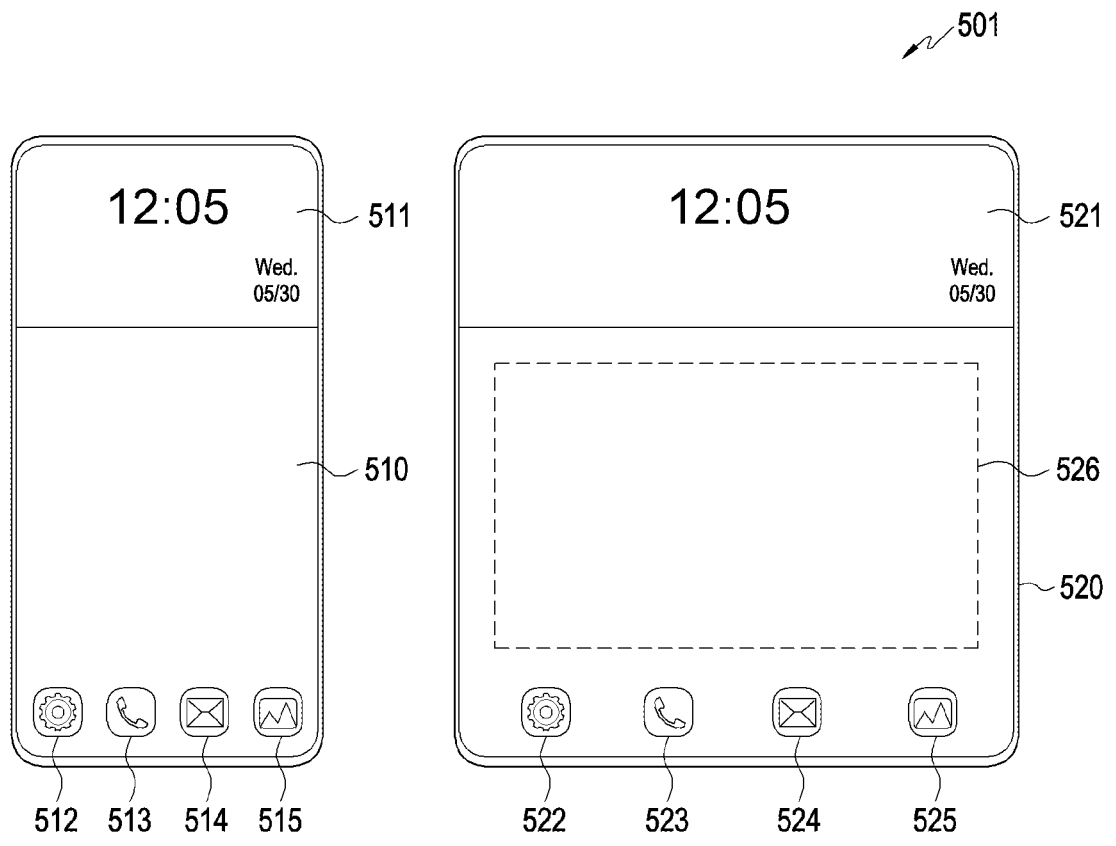
FIG. 5A illustrates example screens displayed in a first state and second state of an electronic device according to various embodiments.

FIG. 5A is illustrates example screens 501 displayed in a first state and second state of an electronic device 101 according to various embodiments.

Referring to FIG. 5A, in an embodiment, the processor 350 may display a first screen 510 through the display 230 (e.g., the first area 231) in the first state of the electronic device 101. For example, the processor 350 may display the first screen 510 including weather and time information 511 and a plurality of first icons 512, 513, 514, and 515 through the display 230 (e.g., the first area 231) in the first state of the electronic device 101.

In an embodiment, when the state of the electronic device 101 changes from the first state to the second state, the processor 350 may display the second screen 520 through the display 230 (e.g., the second area 233 and the third area 235). For example, the processor 350 may display the second screen 520 including weather and time information 521 and a plurality of second icons 522, 523, 524, and 525 through the display 230 (e.g., the second area 233 and the third area 235) in the second state of the electronic device 101.

In an embodiment, when the state of the electronic device 101 changes from the first state to the second state, the processor 350 may change the screen configuration (or screen settings) displayed through the display 230. For example, in the second state of the electronic device 101, the processor 350 may display the plurality of second icons 522, 523, 524, and 525 with a second resolution higher than the first resolution of the plurality of first icons 512, 513, 514, and 515 included in the first screen 510 through the display 230 (e.g., the second area 233 and the third area 235). As another example, in the second state of the electronic device 101, the processor 350 may display the plurality of second icons 522, 523, 524, and 525 arranged in a longer distance than the distance between the plurality of first icons 512, 513, 514, and 515 through the display 230 (e.g., the second area 233 and the third area 235).

In an embodiment, when the state of the electronic device 101 changes from the first state to the second state, the processor 350 may identify whether an external electronic device communicatively connected to the electronic device 101 is present. When there is an external electronic device communicatively connected to the electronic device 101, the processor 350 may display an icon related to the external electronic device in some area 526 of the second screen 520. For example, when the external electronic device communicatively connected to the electronic device 101 is an electronic pen, the processor 350 may display, in some area 526 (or denoted as, for example, an "additional area") of the second screen 520, an icon corresponding to (e.g., mapped to) an electronic pen-related application (e.g., a notepad application, a paint application, or an application for an air action feature capable of executing the function of the electronic device 101 based on information about the position (e.g., coordinates or motion) of the electronic pen). As an example, when the external electronic device communicatively connected to the electronic device 101 is an earset or a speaker, the processor 350 may display, in some area 526 or information area 521 of the second screen 520, an icon corresponding to an application for outputting audio signals through the earset or speaker (e.g., a video application, a video share application, or a music application). As an example, when the external electronic device communicatively connected to the electronic device 101 is a keyboard or a mouse, the processor 350 may display, in some area 526 of the second screen 520, an icon corresponding to an application capable of controlling the operation of the keyboard or mouse (e.g., an application for setting the keyboard or mouse). According to various embodiments, the processor 350 may display an application or application icon or widget related to the external electronic device communicatively connected to the electronic device 101 or whether to connect to the external electronic device, as a separate window, on the second screen 520.

Figure 5B:
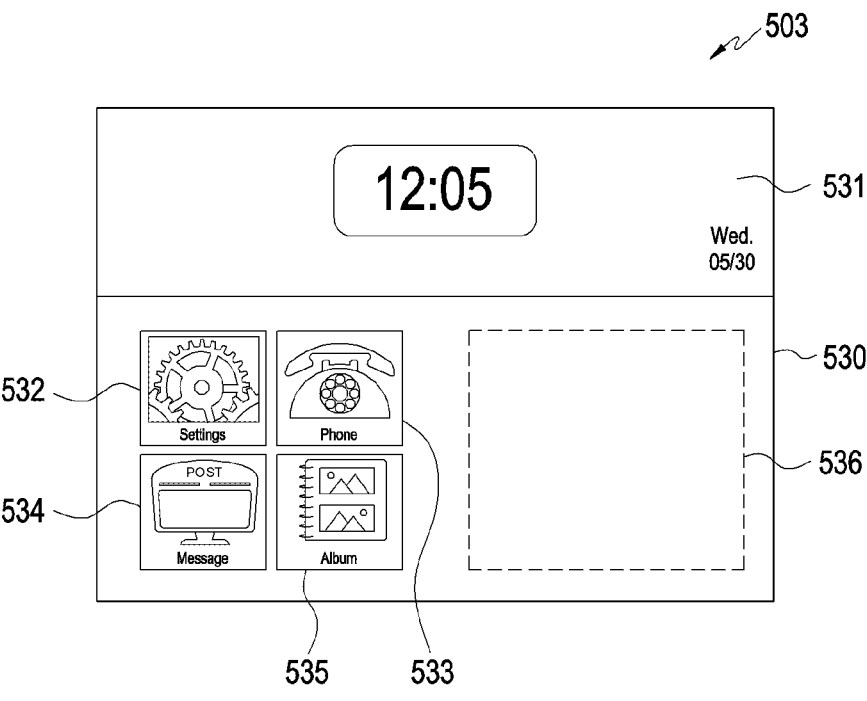
FIG. 5B illustrates example screens displayed in a third state of an electronic device according to various embodiments.
Figure 5B:
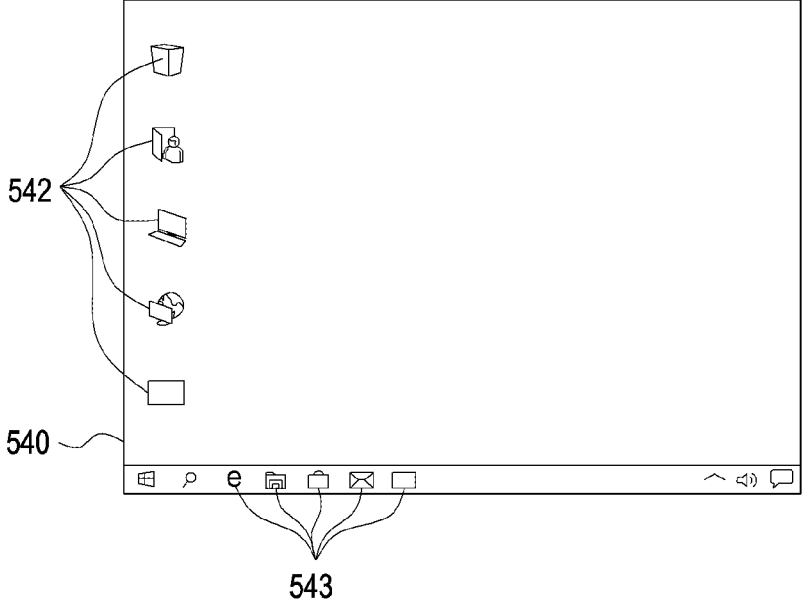

FIG. 5B illustrates example screens 503 displayed in a third state of an electronic device 101 according to various embodiments.

Referring to FIG. 5B, in an embodiment, the processor 350 may display a third screen 530 corresponding to the first mode through the display 230 (e.g., the first area 231, the second area 233, and the third area 235), in the third state of the electronic device 101. For example, the processor 350 may display the third screen 530 including weather and time information 531 and a plurality of third icons 532, 533, 534, and 535 through the display 230 (e.g., the first area 231, the second area 233, and the third area 235) in the third state of the electronic device 101. In the third state of the electronic device 101, the processor 350 may display a plurality of third icons 532, 533, 534, and 535 including names related to the plurality of second icons 522, 523, 524, and 525 included in the second screen 520, through the display 230 (e.g., the first area 231, the second area 233, and the third area 235), as the third screen corresponding to the first mode.

In an embodiment, in the third state of the electronic device 101, when there is an external electronic device communicatively connected to the electronic device 101, the processor 350 may display an icon related to the external electronic device in some area 536 of the third screen 530. According to various embodiments, the processor 350 may display an application or application icon or widget related to the external electronic device communicatively connected to the electronic device 101 or whether to connect to the external electronic device, as a separate window, on the third screen 530.

In an embodiment, the processor 350 may display a fourth screen 540 corresponding to the second mode through the display 230 (e.g., the first area 231, the second area 233, and the third area 235), in the third state of the electronic device 101. For example, in the third state of the electronic device 101, the processor 350 may display a fourth screen 540 (e.g., a background screen of the PC environment) including weather and time information, a plurality of fourth icons 542, and icons 543 displayed in the task bar, through the display 230.

Figure 5C:
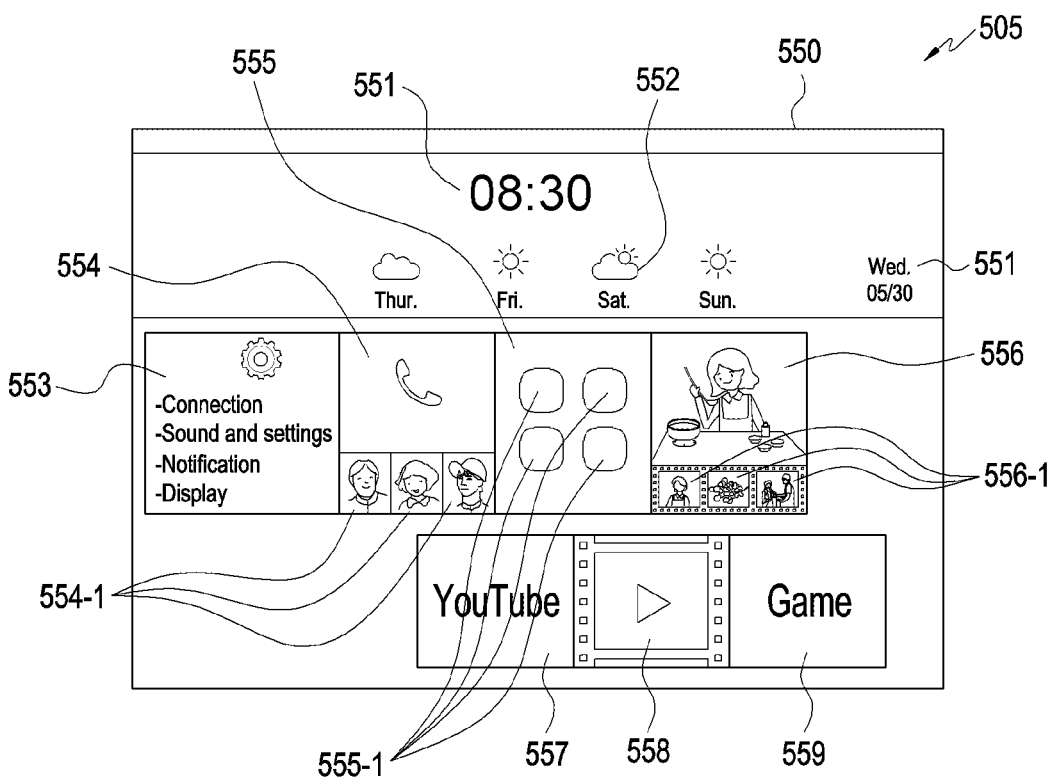
FIG. 5C illustrates an example screen corresponding to a first mode of an electronic device according to various embodiments.

FIG. 5C illustrates an example screen 505 corresponding to a first mode of an electronic device 101 according to various embodiments.

Referring to FIG. 5C, in an embodiment, the processor 350 may display the third screen 550 corresponding to the first mode through the display 230 in the third state of the electronic device 101.

In an embodiment, in comparison between the second screen 520 of FIG. 5A and the third screen 530, the processor 350 may display, through the display 230, the third screen 530 further including weather information 552 about the week of the date, in addition to the weather and time information 551 as compared with the second screen 520. In an embodiment, the processor 350 may display, through the display 230, the third screen 530 including a plurality of third icons 553, 554, 555, and 556 having a different form from that of the plurality of second icons 522, 523, 524, and 525 included in the second screen 520.

In an embodiment, the processor 350 may display, through the display 230, an icon including detailed information about the application corresponding to the icon, as compared with the icon included in the first screen 510 or the second screen 520. For example, the processor 350 may display an icon 553 including detailed information about the settings of the electronic device 101 through the display 230.

In an embodiment, the processor 350 may display an icon reflecting the use history through the display 230, as compared with the icon included in the first screen 510 or the second screen 520. For example, the processor 350 may display, through the display 230, an icon 554 including information 554-1 indicating contacts (e.g., contacts to which the latest call was made or calls were frequently made during a designated period) based on the user's use history (e.g., call history) for the application.

In an embodiment, the processor 350 may display an icon reflecting the use history through the display 230, as compared with the icon included in the first screen 510 or the second screen 520.

In an embodiment, the processor 350 may display, through the display 230, icons corresponding to applications belonging to the same category or the same group, as compared with the icon included in the first screen 510 or the second screen 520. For example, the processor 350 may display, through the display 230, an icon 555 including icons 555-1 corresponding to message applications (e.g., email message application or voice message application) belonging to the same category (e.g., message application category) as the text message application.

In an embodiment, the processor 350 may display, through the display 230, an icon indicating the screen corresponding to the next depth (the next screen state when the application is executed on the screen), as compared with the icon included in the first screen 510 or the second screen 520. For example, the processor 350 may display images 556-1 (e.g., thumbnail images) to be displayed after a gallery application is executed, through the display 230.

In an embodiment, in the third state of the electronic device 101, when the external electronic device communicatively connected to the electronic device 101 is a speaker or an earset, the processor 350 may display, through the display 230, a third screen 550 including icons 557, 558, and 559 corresponding to applications (e.g., screen share application, video application, or game application) for outputting audio signals through the speaker or earset, which are not included in the second screen 520.

In an embodiment, in the third state of the electronic device 101, when the external electronic device communicatively connected to the electronic device 101 is an electronic pen, the processor 350 may display, through the display 230, a third screen 550 including icons corresponding to applications (e.g., note application, paint application, or AR application) using the electronic pen, which are not included in the second screen 520.

Figure 6:
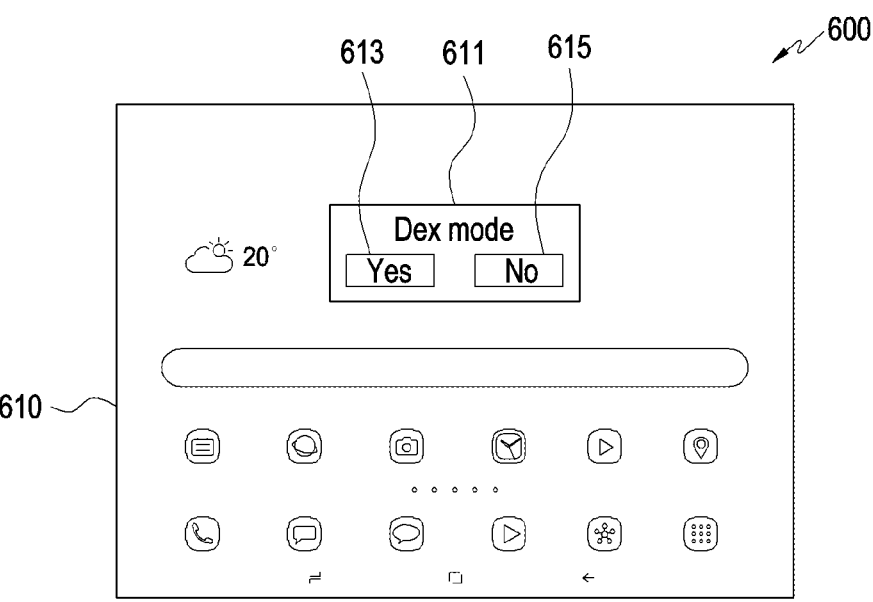
FIG. 6 illustrates an example method for selecting a screen corresponding to a first mode or a screen corresponding to a second mode based on a user input in a third state of an electronic device according to various embodiments.
Figure 6:
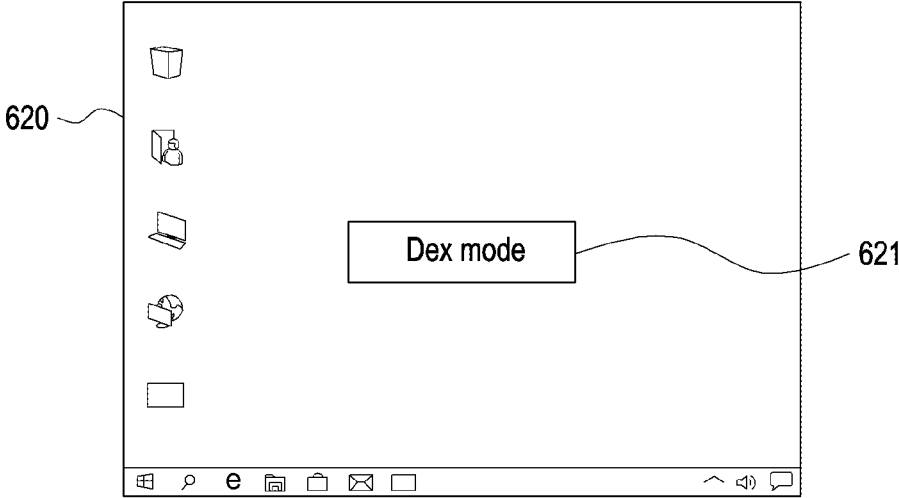

FIG. 6 is a diagram 600 illustrating an example method for selecting a screen corresponding to a first mode or a screen corresponding to a second mode based on a user input in a third state of an electronic device 101 according to various embodiments.

Referring to FIG. 6, in an embodiment, when the state of the electronic device 101 changes from the first state or second state to the third state, the processor 350 may identify an external electronic device communicatively connected to the electronic device 101 is present through the communication module 310. In response to identifying the external electronic device communicatively connected to the electronic device 101, the processor 350 may display a first object for displaying the third screen corresponding to the first mode and a second object for displaying the fourth screen corresponding to the second mode, through the display 230. As another example, the processor 350 may display a window 611 including a first object 615 for displaying the third screen corresponding to the first mode and a second object 613 for displaying the fourth screen corresponding to the second mode, on the third screen 610 through the display 230. Upon receiving an input for selecting the second object 613 from the user, the processor 350 may display a fourth screen 620 corresponding to the second mode through the display 230 and display information 621 indicating that the electronic device 101 operates in the second mode, on the fourth screen 620. Although not shown in FIG. 6, upon receiving an input for selecting the first object 615 from the user, the processor 350 may control the display 230 to maintain display of the third screen 610 corresponding to the first mode.

However, the method for selecting the screen corresponding to the first mode or the screen corresponding to the second mode based on the user's input in the third state of the electronic device 101 is not limited to the examples described in connection with FIG. 6. For example, when the external electronic device communicatively connected to the electronic device 101 is a keyboard, the processor 350 may display the fourth screen corresponding to the second mode through the display 230 in response to reception of an input to a designated key from the keyboard. As an example, when the external electronic device communicatively connected to the electronic device 101 is a mouse, the processor 350 may display the fourth screen corresponding to the second mode through the display in response to reception of a designated input from the mouse (e.g., a single click, double click, or long click input through the mouse). As an example, the processor 350 may display an object for switching between the third screen corresponding to the first mode and the fourth screen corresponding to the second mode through the display 230. The processor 350 may display the fourth screen corresponding to the second mode through the display 230 based on an input to the object.

Figure 7:
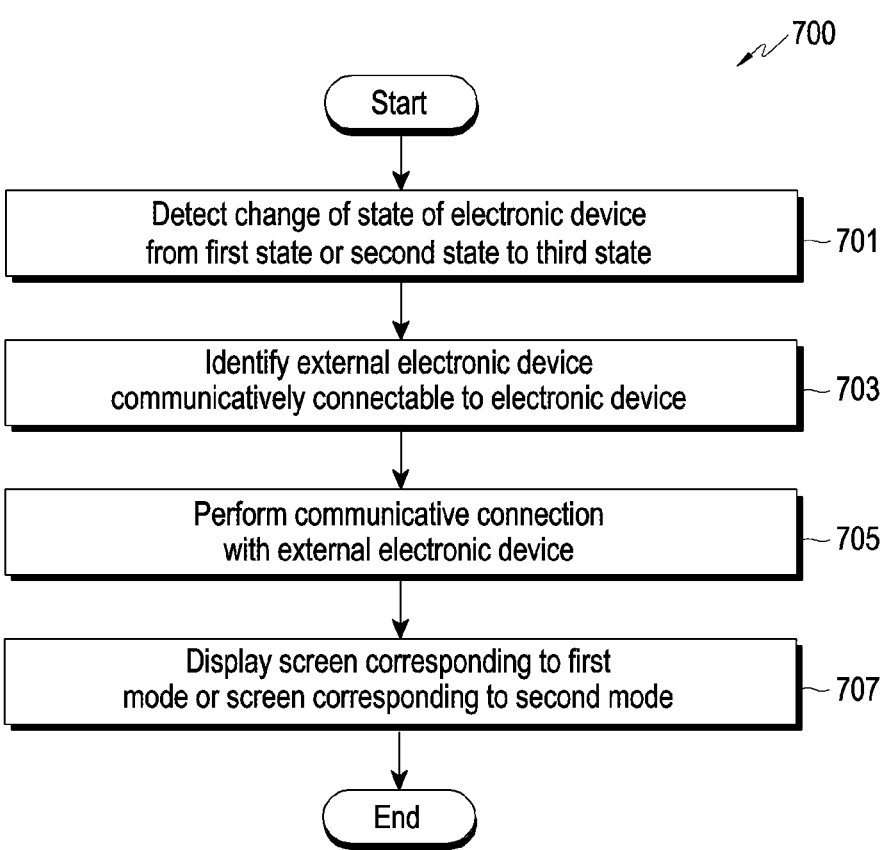
FIG. 7 is a flowchart illustrating an example method for providing a screen using a flexible display according to various embodiments.

FIG. 7 is a flowchart 700 illustrating an example method for providing a screen using a flexible display according to various embodiments.

Referring to FIG. 7, in operation 701, in an embodiment, the processor 350 may detect a change (or switch) of the state (e.g., folding state or posture) of the electronic device 101 from a first state or second state to a third state, through the sensor 330.

Since the examples of operation 701 are at least partially the same or similar to the examples of operation 401 of FIG. 4, a detailed description thereof is not repeated here.

In operation 703, in an embodiment, when the state of the electronic device 101 changes to the third state, the processor 350 may identify an external electronic device communicatively connectable to the electronic device 101 is present through the communication module 310. For example, when the state of the electronic device 101 changes to the third state, the processor 350 may search for an external electronic device communicatively connectable to the electronic device 101 through the short-range wireless communication module.

In operation 705, in an embodiment, upon identifying an external electronic device communicatively connectable to the electronic device 101, the processor 350 may perform communicative connection with the external electronic device through the communication module 310. For example, upon identifying an external electronic device communicatively connectable to the electronic device 101, the processor 350 may communicatively connect the external electronic device to the electronic device 101 through the communication module 310 based on a user input. As an example, upon identifying a plurality of external electronic devices communicatively connectable to the electronic device 101, the processor 350 may display information about the plurality of external electronic devices through the display 230. The processor 350 may select at least one external electronic device from among the plurality of external electronic devices based, for example, on a user input. The processor 350 may communicatively connect the selected at least one external electronic device to the electronic device 101 through the communication module 310.

In an embodiment, the processor 350 may communicatively connect the external electronic device to the electronic device 101 through the communication module, based on a running application. For example, when a video application is running, the processor 350 may communicatively connect to the earset or speaker related to the video application (e.g., capable of outputting audio signals as the video application is executed) through the communication module 310, automatically (e.g., in response to detection of a change of the state of the electronic device from the first state or second state to the third state). As an example, when a paint application is running, the processor 350 may communicatively connect the mouse or electronic pen related to the paint application (e.g., capable of providing input to the function of the paint application) to the electronic device 101 through the communication module 310, automatically (e.g., in response to detection of a change of the state of the electronic device from the first state or second state to the third state). As an example, when a message application is running, the processor 350 may communicatively connect the keyboard related to the message application (e.g., capable of providing input to the function of the message application) to the electronic device 101 through the communication module 310.

In an embodiment, upon identifying a plurality of external electronic devices communicatively connectable to the electronic device 101, the processor 350 may, for example, determine priorities between the plurality of external electronic devices. For example, upon identifying a plurality of external electronic devices communicatively connectable to the electronic device 101, the processor 350 may determine that the priority of the external electronic device (e.g., keyboard or mouse) capable of performing functions in the second mode in addition to the first mode is higher than the priorities of the other external electronic devices (e.g., earset, pen, and speaker). The processor 350 may communicatively connect the electronic device 101 with the external electronic devices in order of priority.

In an embodiment, the processor 350 may communicatively connect with the latest external electronic device connected to the electronic device 101 or communicatively connect with the last connected electronic device 101 based on a user input through the communication module 310. In operation 707, the processor 350 may display the screen corresponding to the first mode or the screen corresponding to the second mode different from the first mode, through the display 230 (e.g., the first area 231, the second area 233, and the third area 235), based on the type of the external electronic device communicatively connected to the electronic device 101.

Since the examples of operation 707 are at least partially the same or similar to the examples of operation 407 of FIG. 4, a detailed description thereof is not repeated below.

Figure 8:
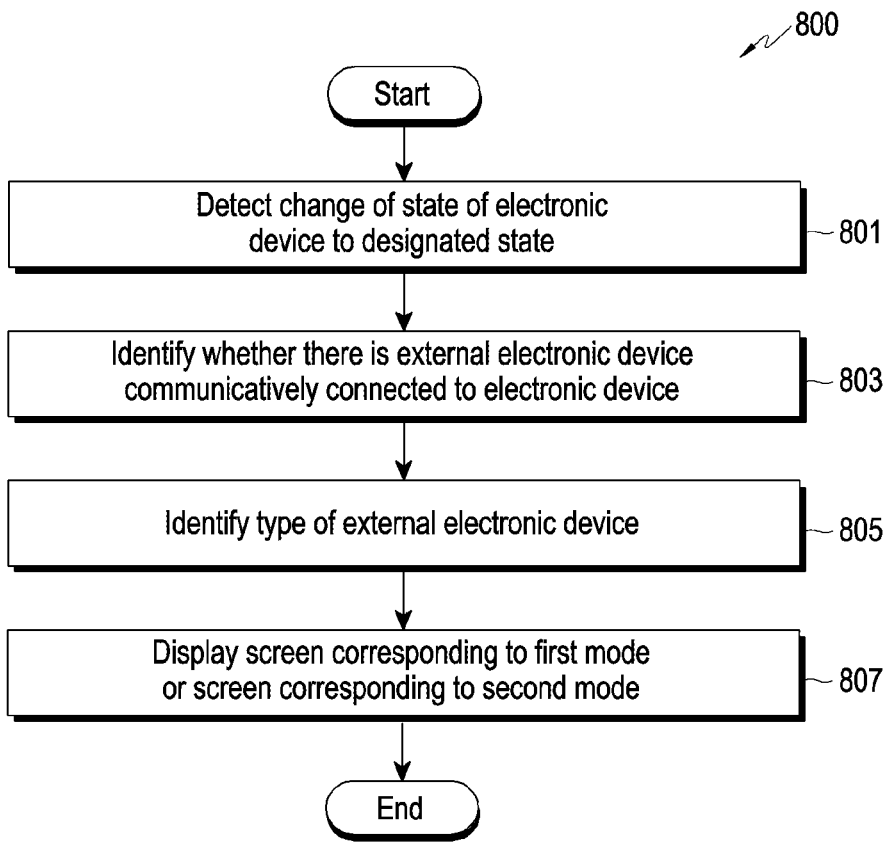
FIG. 8 is a flowchart illustrating an example method for providing a screen using a flexible display in a designated state of an electronic device according to various embodiments.

FIG. 8 is a flowchart 800 illustrating an example method for providing a screen using a flexible display in a designated state of an electronic device 101 according to various embodiments.

Figure 9:
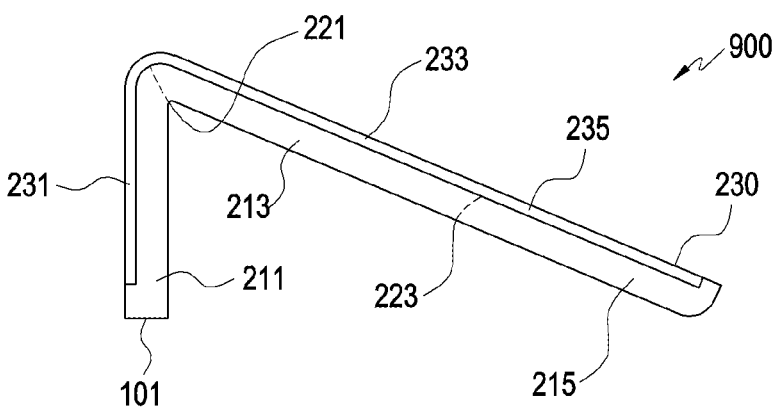
FIG. 9 illustrates an example method for providing a screen using a flexible display in a designated state of an electronic device according to various embodiments.

FIG. 9 is a diagram 900 illustrating an example method for providing a screen using a flexible display in a designated state of an electronic device 101 according to various embodiments.

Referring to FIGS. 8 and 9, in operation 801, in an embodiment, the processor 350 may detect a change of the state (e.g., folding state or posture) of the electronic device 101 to a designated state through the sensor 330.

In an embodiment, the designated state may be a state in which the angle between the first housing 211 and the second housing 213 about the first hinge unit 221 corresponds to a designated angle (or a designated angle range), and the second housing 213 and the third housing 215 are unfolded about the second hinge unit 223, as shown in FIG. 9. In an embodiment, the designated state may be a state in which the first housing 211 and the second housing 213 are at a designated first angle or more (or within a designated first angle range) about the first hinge unit 221, and the second housing 213 and the third housing 215 are unfolded at a designated second angle or more about the second hinge unit 223. As described above, the designated state of the electronic device 101 may also be denoted, for example, as a third state of the electronic device 101.

In an embodiment, the designated state may be a state in which, as the first housing 211 supports the electronic device 101, and the second housing 213 and the third housing 215 are unfolded about the second hinge unit 223, the second area 233 and third area 235 of the display 230 form a predetermined angle from the ground. In an embodiment, the processor 350 may detect a change of the state of the electronic device 101 from the first state or second state to the designated state through the first sensor.

In an embodiment, the designated state may be a state in which the electronic device 101 is mounted on an external device. For example, the designated state may be a state in which the electronic device 101 is mounted on a charger (e.g., a charging station) capable of mounting the electronic device 101. Upon identifying the state of the electronic device 101 being the third state, and communicative connection with the charger, the processor 350 may identify that the electronic device 101 is in the designated state. In an embodiment, the designated state may be a state in which the electronic device 101 is mounted on an object (e.g., a book stand). For example, upon detecting that the state of the electronic device 101 is the third state, and the electronic device 101 is mounted on the object through a sensor (e.g., proximity sensor), the processor 350 may identify that the electronic device 101 is in the designated state.

In operation 803, in an embodiment, the processor 350 may identify whether an external electronic device communicatively connected to the electronic device 101 is present (exists) through the communication module 310.

Since the examples of operation 803 are at least partially the same or similar to the operation 403 of FIG. 4, a detailed description thereof is not repeated below.

In operation 805, in an embodiment, when it is identified that an external electronic device communicatively connected to the electronic device 101 is present, the processor 350 may identify the type of the external electronic device.

Since the examples of operation 805 are at least partially the same or similar to the operation 405 of FIG. 4, a detailed description thereof is not repeated below.

In operation 807, the processor 350 may display a screen corresponding to a first mode or a screen corresponding to a second mode, different from the first mode, through the display 230 (e.g., the second area 233 and the third area 235) based on the type of the external electronic device communicatively connected to the electronic device 101.

In an embodiment, when there is no external electronic device communicatively connected to the electronic device 101 (e.g., when there is no designated external electronic device communicatively connected to the electronic device 101), the processor 350 may display the third screen using the third screen configuration corresponding to the first mode, through the display 230.

In an embodiment, when the external electronic device communicatively connected to the electronic device 101 is at least one of an electronic pen, a speaker, or an earset, the processor 350 may display the third screen through the display 230.

In an embodiment, upon detecting detachment of the electronic pen from the electronic device 101, the processor 350 may display the third screen through the display 230.

In an embodiment, when the external electronic device communicatively connected to the electronic device 101 is at least one of a keyboard or a mouse, the processor 350 may display the fourth screen using a fourth screen configuration corresponding to the second mode through the display 230.

In an embodiment, upon identifying that the external electronic device communicatively connected to the electronic device 101 is at least one of a keyboard or a mouse, the processor 350 may display the fourth screen corresponding to the second mode through the display 230 in response to reception of an additional input.

According to various embodiments of the disclosure, a method for providing a screen using a flexible display by an electronic device 101 may include detecting a change of a state of the electronic device 101 from a first state or a second state to a third state in which a second housing 211 is unfolded about a hinge unit at a designated angle or more from a first housing 213 and a third housing 215, through at least one sensor 330 of the electronic device 101, upon detecting the change of the state of the electronic device 101 to the third state, identifying whether there is an external electronic device communicatively connected or communicatively connectable to the electronic device 101 through a communication module 310 of the electronic device 101, when there is the external electronic device communicatively connected or communicatively connectable to the electronic device 101, identifying a type of the external electronic device, and displaying a screen corresponding to a first mode or a screen corresponding to a second mode different from the first mode, through a first area 231 of the display 230, disposed on the first housing, a second area 233 of the display 230, disposed on the second housing, and a third area 235 of the display 230, disposed on the third housing, based on the type of the external electronic device.

According to various embodiments, displaying the screen corresponding to the first mode or the screen corresponding to the second mode different from the first mode may include, when the type of the external electronic device is an external input device, displaying the screen corresponding to the second mode through the first area 231, the second area 233, and the third area 235 of the display 230.

According to various embodiments, displaying the screen corresponding to the first mode or the screen corresponding to the second mode different from the first mode may include, when the type of the external electronic device is the external input device, and an input for displaying the screen corresponding to the second mode is received, displaying the screen corresponding to the second mode, through the first area 231, the second area 233, and the third area 235 of the display 230.

According to various embodiments, displaying the screen corresponding to the first mode or the screen corresponding to the second mode different from the first mode may include, when the external electronic device communicatively connected to the electronic device 101 is absent, or a designated external electronic device is not communicatively connected to the electronic device 101, displaying the screen corresponding to the first mode through the first area 231, the second area 233, and the third area 235 of the display 230.

According to various embodiments, the method may further include, upon detecting the change of the state of the electronic device 101 to the third state, identifying the external electronic device communicatively connectable to the electronic device 101 through the communication module 310 and communicatively connecting the external electronic device to the electronic device 101 through the communication module 310.

According to various embodiments, the method may further include detecting a change of the state of the electronic device 101 to an unfolded state in which the first housing 211 and the second housing 213 are at a designated first angle or more about a first hinge unit 221, and the second housing 213 and the third housing 215 are unfolded about a second hinge unit at a designated second angle or more through the at least one sensor 330, upon detecting the change of the state of the electronic device 101 to the unfolded state, identifying whether there is an external electronic device communicatively connected to the electronic device 101 through the communication module 310, when there is the external electronic device communicatively connected to the electronic device 101, identifying a type of the external electronic device, and displaying the screen corresponding to the first mode or the screen corresponding to the second mode different from the first mode, through the second area 233 and the third area 235 of the display 230, based on the type of the external electronic device.

According to various embodiments, the first state may be a state in which the first area 231 faces in a direction opposite to a direction in which the second area 233 aces, and the second area 233 and the third area 235 face each other, and the second state may be a state in which the first area 231 faces in the direction opposite to the direction in which the second area 233 faces, and the second area 233 and the third area 235 face in the same direction. The method may further include displaying a plurality of first icons through the first area 231 in the first state, detecting a change of the state of the electronic device 101 from the first state to the second state through the at least one sensor 330 and displaying a plurality of second icons at a second resolution higher than a first resolution of the plurality of first icons or displaying the plurality of second icons arranged by a distance than longer a distance between the plurality of first icons, through the second area 233 and the third area 235, in the second state.

According to various embodiments, the screen corresponding to the first mode may include a plurality of third icons, different from the plurality of first icons and the plurality of second icons, and an icon corresponding to an application related to the external electronic device.

According to various embodiments, the first mode may be a tablet mode, and the second mode may be a desktop mode.

Figure 10:
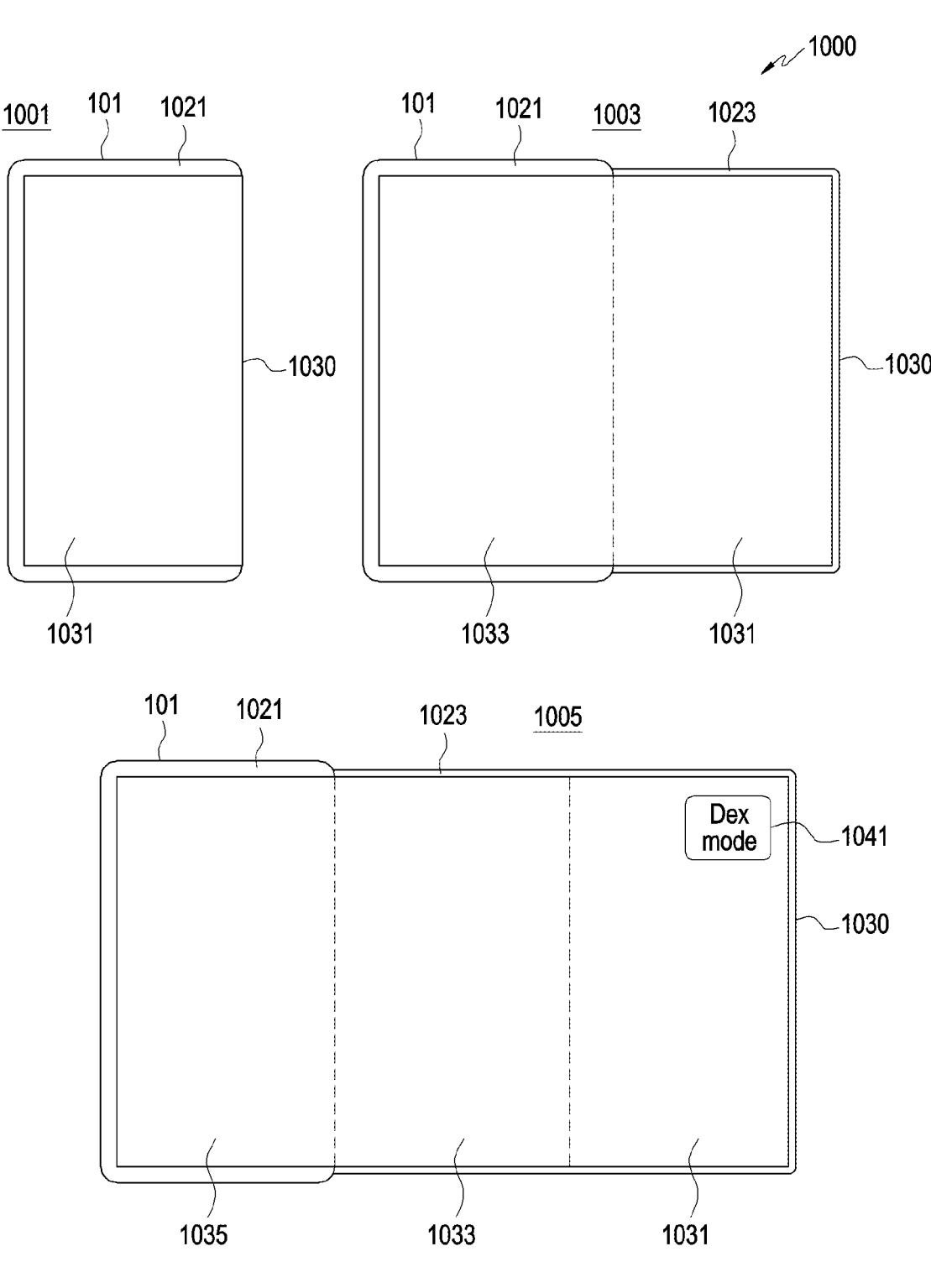
FIG. 10 illustrates an example electronic device according to various embodiments.

FIG. 10 is a diagram 1000 illustrating an example electronic device 101 according to various embodiments.

Referring to FIG. 10, in an embodiment, the electronic device 101 may be an electronic device 101 including a display 1030 at least a portion of which is slidable.

In an embodiment, the electronic device 101 may include a first housing 1021, a second housing 1023, and a display 1030. In an embodiment, although not shown in FIG. 10, the electronic device 101 may further include at least one of the components shown in FIG. 1.

In an embodiment, the second housing 1023 may be disposed to be slidable on the first housing 1021. For example, the second housing 1023 may be disposed to reciprocate by a predetermined distance with respect to the first housing 1021.

In an embodiment, the display 1030 may be a flexible display. For example, a portion of a second area 1033 of the display 1030 may be transformed into a curved shape while the second housing 1023 slides on the first housing 1021. In an embodiment, the display 1030 may be guided by a roller disposed in the first housing 1021 to extend while the second housing 1023 slides on (or in) the first housing 1021. For example, the partial area of the display 1030 may be exposed to the outside as the second housing 1023 slides on (or in) the first housing 1021.

In an embodiment, 1001 may indicate the state of the electronic device 101 in which the first area 1031 of the display 1030 is visually exposed to the outside. For example, 1001 may indicate the state of the electronic device 101 in which the second area 1033 of the display 1030 extending from the first area 1031 of the display 1030 and the third area 1035 of the display 1030 extending from the second area 1033 of the display 1030 are received (or inserted) in the first housing 1021, and the first area 1031 of the display 1030 is exposed to the outside. Hereinafter, the state of the electronic device 101 indicated by 1001 is, for example, denoted as a "first state of the electronic device 101" (or "first state").

In an embodiment, 1003 may indicate the state of the electronic device 101 in which the first area 1031 and second area 1033 of the display 1030 are visually exposed to the outside. For example, 1003 may indicate the state in which, as the second housing 1023 slides on (or in) the first housing 1021, the second area 1033 of the display 1030, in addition to the first area 1031 of the display 1030, is exposed to the outside. Hereinafter, the state of the electronic device 101 indicated by 1003 is, for example, denoted as a "second state of the electronic device 101" (or "second state").

In an embodiment, 1005 may indicate a state of the electronic device 101 in which the first area 1031, second area 1033, and third area 1035 of the display 1030 are visually exposed to the outside. For example, 1005 may indicate the state in which as the second housing 1023 slides on (or in) the first housing 1021, the third area 1035 of the display 1030, in addition to the first area 1031 and second area 1033 of the display 1030, is exposed to the outside. Hereinafter, the state of the electronic device 101 as indicated by 1005 is, for example, denoted as a "third state of the electronic device 101" (or "third state").

In an embodiment, as indicated by 1005, in the third state of the electronic device 101, an object 1041 for switching the screen corresponding to the first mode and the screen corresponding to the second mode may be displayed through the display 1030. However, the method for displaying the screen corresponding to the first mode and the screen corresponding to the second mode is not limited to the above-described example.

In an embodiment, although not shown in FIG. 10, the electronic device 101 may further include a sensor (e.g., the sensor 330) capable of detecting the first state, second state, and third state of the electronic device 101. For example, the electronic device 101 may further include a sensor (e.g., hall sensor, mechanically operating switching element, or photo detector) (hereinafter, referred to as a "first sensor") capable of detecting an increase or decrease in the area of the display 1030 (or slide of the second housing 1023 on the first housing 1021). As an example, the electronic device 101 may further include at least one sensor capable of detecting the externally exposed area of the display 1030.

In an embodiment, although not shown in FIG. 10, there may be further included a sensor (hereinafter, referred to as a "second sensor") for detecting reception (or attachment) of an electronic pen in the electronic device 101 or separation (e.g., detachment) of the electronic pen from the electronic device 101.

Examples of the method for providing a screen by the electronic device 101 shown in FIG. 10 are described below with reference to FIGS. 11 to 13.

Figure 11:
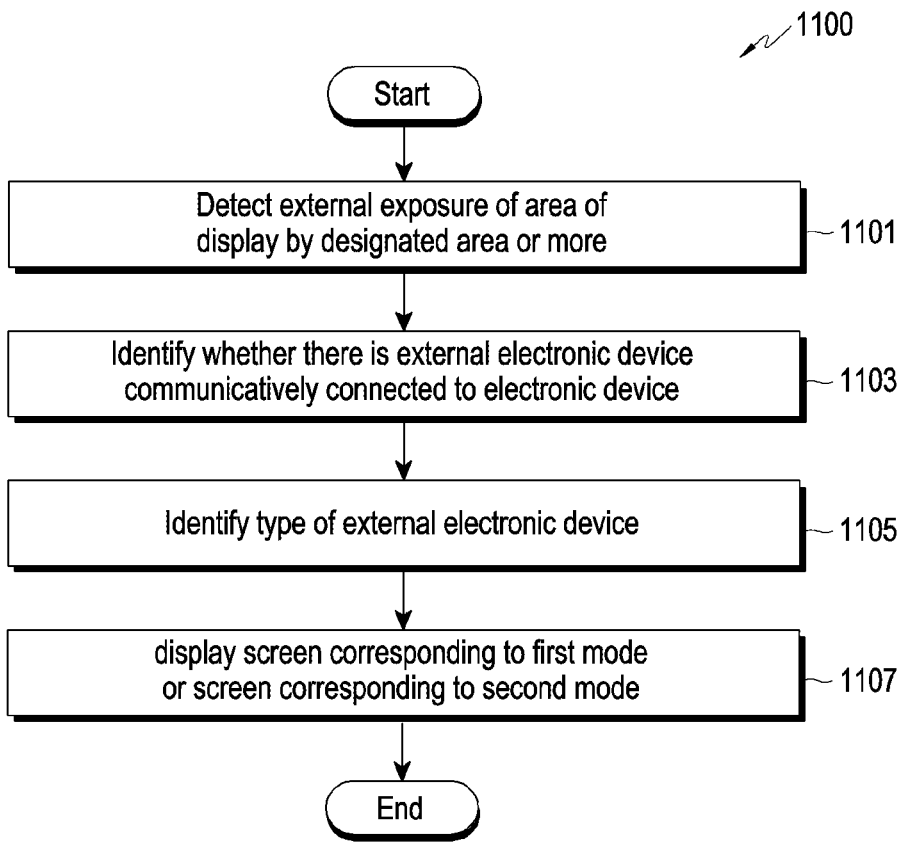
FIG. 11 is a flowchart illustrating an example method for providing a screen using a flexible display according to various embodiments.

FIG. 11 is a flowchart 1100 illustrating an example method for providing a screen using a flexible display 1030 according to various embodiments.

In operation 1101, in an embodiment, the processor 350 may detect that the area of the display 1030 is visually exposed to the outside by a designated area or more through the sensor (e.g., the sensor 330).

In an embodiment, the processor 350 may detect that the state of the electronic device 101 changes from the first state or second state to the third state through the first sensor (e.g., hall sensor, mechanically operating switching element, or photo detector). For example, the processor 350 may detect external exposure of the third area 1035, in addition to the first area 1031 and the second area 1033 of the display 1030, through the first sensor. In an embodiment, the processor 350 may detect a change of the state of the electronic device 101 from the first state or second state to a state in which a portion of the third area 1035 is exposed to the outside (e.g., a state in which a portion of the third area 1035 is exposed by a designated area or more), through the first sensor.

In operation 1103, in an embodiment, when the area of the display 1030 is exposed to the outside by a designated area or more, the processor 350 may identify whether an external electronic device communicatively connected to the electronic device 101 is present (exists) through the communication module 310.

In an embodiment, when the area of the display 1030 is exposed to the outside by a designated area or more, the processor 350 may identify whether there is an external electronic device communicatively connected to the electronic device 101 through the communication module 310.

In an embodiment, the processor 350 may identify whether an external electronic device communicatively connected to the electronic device 101 is present through the short-range wireless communication module. In an embodiment, the processor 350 may identify whether an external electronic device communicatively connected to the electronic device 101 is present through the wired communication module 194.

In operation 1105, in an embodiment, when it is identified that an external electronic device communicatively connected to the electronic device 101 is present, the processor 350 may identify the type of the external electronic device.

In an embodiment, the processor 350 may identify the type of the external electronic device communicatively connected to the electronic device 101, thereby identifying whether the external electronic device is a designated external electronic device. For example, the processor 350 may identify whether the external electronic device communicatively connected to the electronic device 101 is at least one of a keyboard, a mouse, a speaker, an earset, or an electronic pen. However, the operation of identifying whether the external electronic device communicatively connected to the electronic device 101 is a designated external electronic device may be omitted.

In an embodiment, the processor 350 may identify whether the electronic pen is detached (e.g., separated) from the electronic device 101 through the second sensor.

However, the external electronic device communicatively connected to the electronic device 101 is not limited to the above-described examples.

In operation 1107, the processor 350 may display a screen corresponding to a first mode or a screen corresponding to a second mode, different from the first mode, through the display 1030 (e.g., the first area 1031, the second area 1033, and the third area 1035) based on the type of the external electronic device communicatively connected to the electronic device 101.

Since the examples of operation 1107 are at least partially the same or similar to the examples of operation 407 of FIG. 4, a detailed description thereof is not repeated below.

Although not described in connection with FIG. 11, in an embodiment, the processor 350 may perform the operation of, when the area of the display 1030 is exposed to the outside by a designated area or more, identifying an external electronic device communicatively connectable to the electronic device 101, the operation of performing communicative connection with the external electronic device, and the operation of displaying the screen corresponding to the first mode or the screen corresponding to the second mode based on the type of the external electronic device, as described in connection with the examples of FIG. 9.

Figure 12:
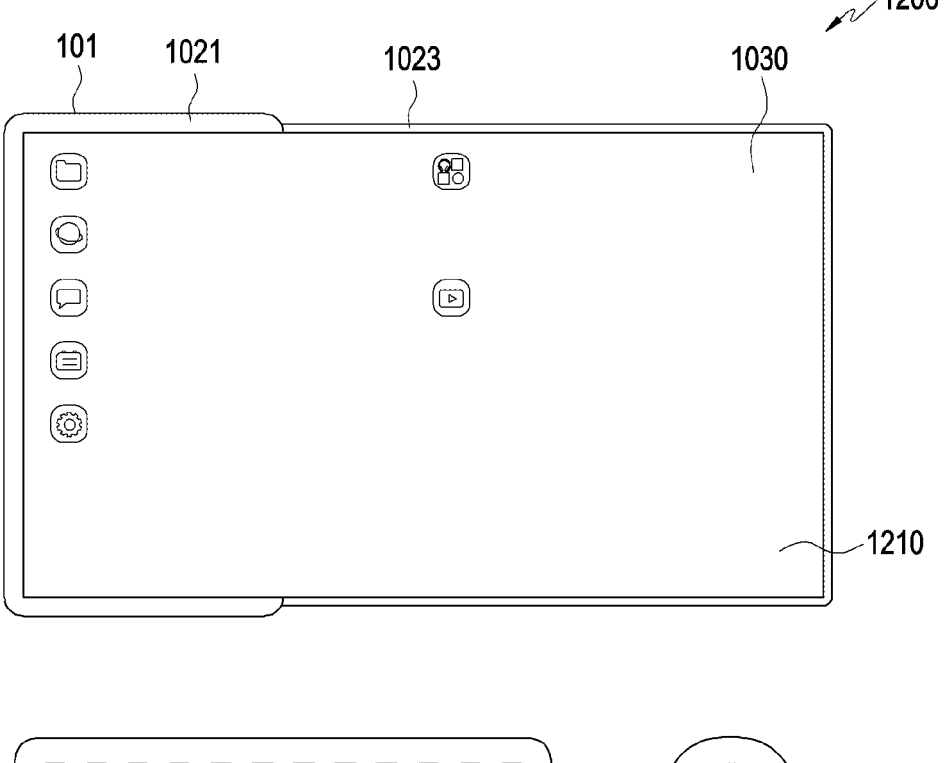
FIG. 12 illustrates an example screen corresponding to a second mode according to various embodiments.
Figure 12:
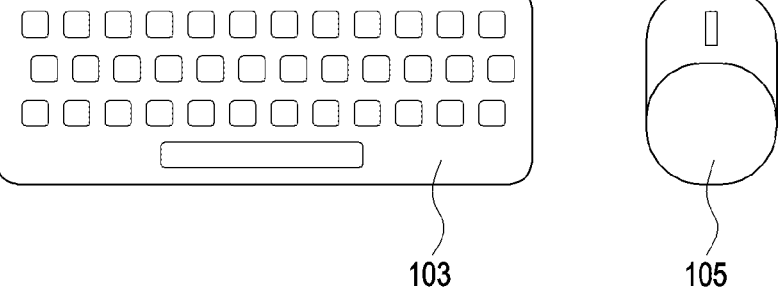

FIG. 12 is a diagram 1200 illustrating an example screen corresponding to a second mode according to various embodiments.

Figure 13:
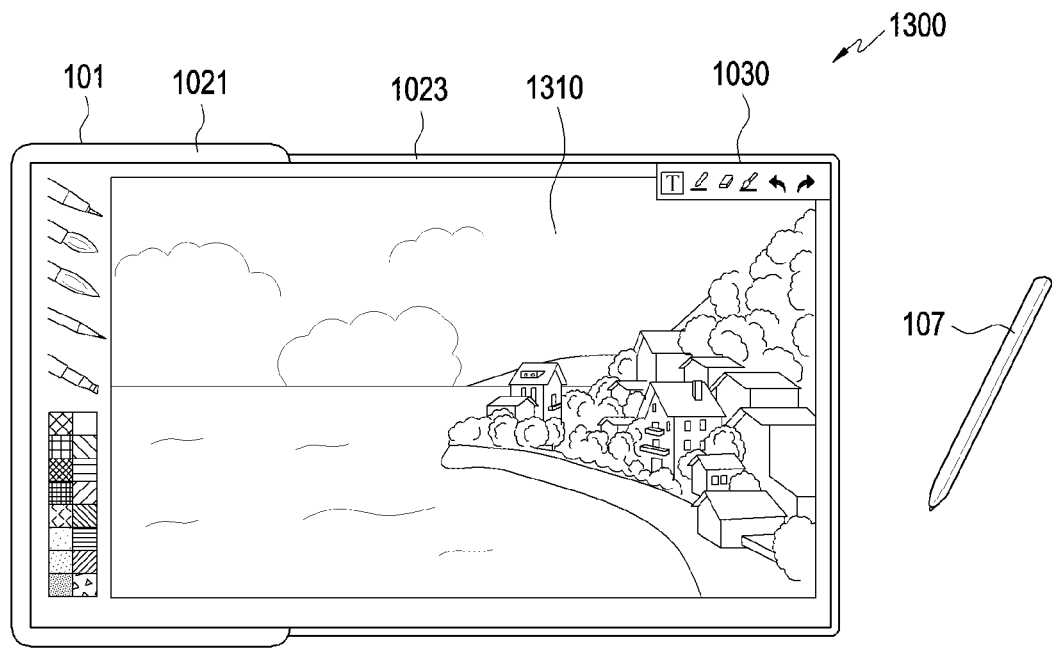
FIG. 13 illustrates an example screen corresponding to a first mode according to various embodiments.

FIG. 13 is a diagram 1300 illustrating an example screen corresponding to a first mode according to various embodiments.

Referring to FIGS. 12 and 13, in an embodiment, when the area of the display 1030 is exposed to the outside by a designated area or more, and an external electronic device is communicatively connected to the electronic device 101, the processor 350 may display the screen corresponding to the second mode through the display 1030. For example, when the first area 1031, second area 1033, and third area 1035 of the display 1030 are exposed to the outside as the second housing 1023 slides on (or in) the first housing 1021, and the keyboard 103 and mouse 105 are communicatively connected to the electronic device 101 as shown in FIG. 12, the processor 350 may display the screen 1210 (e.g., background screen) corresponding to the second mode through the first area 1031, second area 1033, and third area 1035 of the display 1030.

In an embodiment, when the area of the display 1030 is exposed to the outside by the designated area or more, and the external electronic device is communicatively connected to the electronic device 101, the processor 350 may display the screen corresponding to the first mode through the display 1030. For example, as shown in FIG. 13, when the first area 1031, second area 1033, and third area 1035 of the display 1030 are exposed to the outside, and the electronic pen 107 is communicatively connected to the electronic device 101 or the electronic pen 107 is detached from the electronic device 101 as the second housing 1023 slides on (or in) the first housing 1021, the processor 350 may display a screen 1310 (e.g., execution screen of the paint application) corresponding to the first mode through the first area 1031, second area 1033, and third area 1035 of the display 1030.

Figure 14:
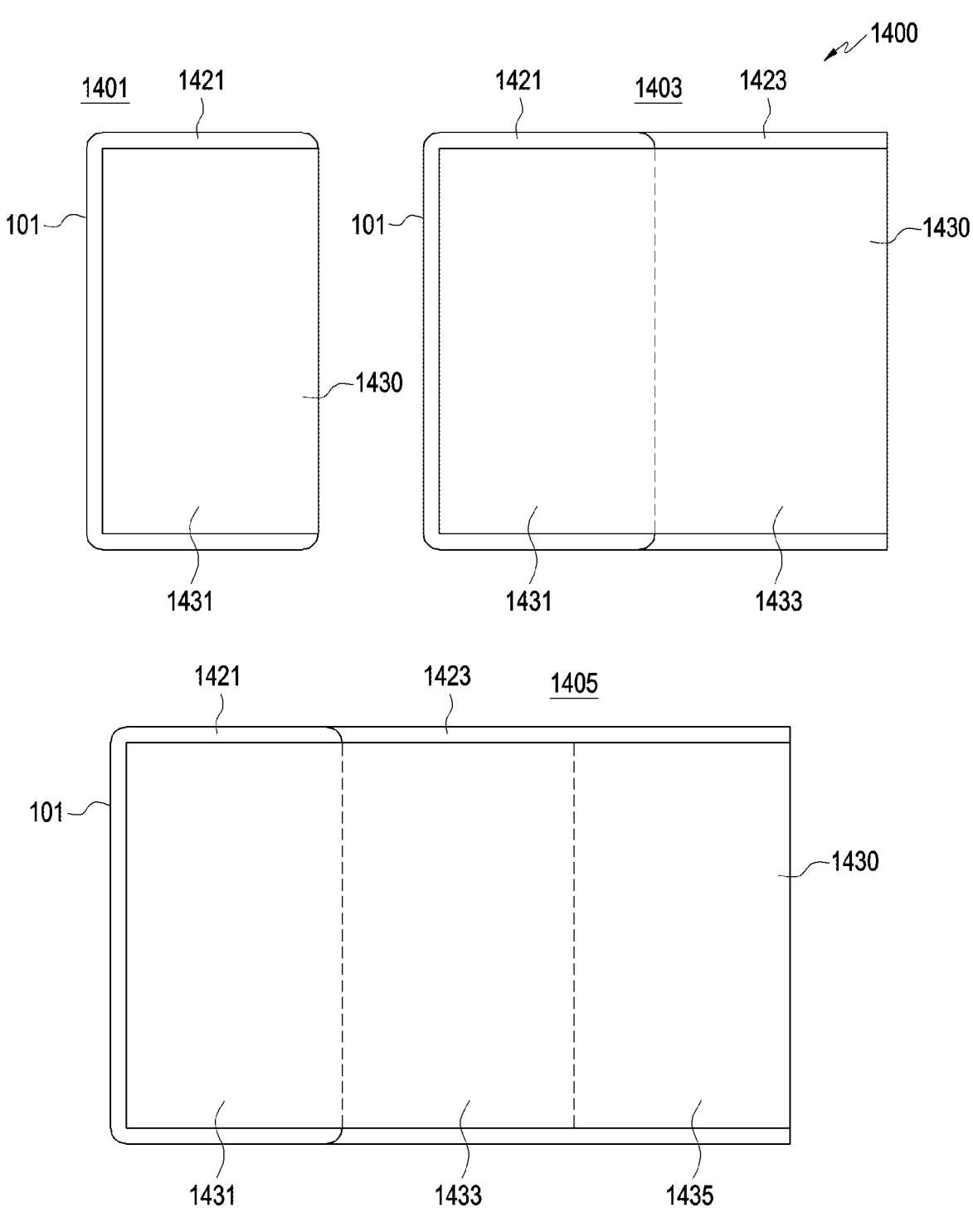
FIG. 14 is a diagram illustrating an example electronic device according to various embodiments.

FIG. 14 is a diagram 1400 illustrating an example electronic device 101 according to various embodiments.

Referring to FIG. 14, in an embodiment, the electronic device 101 may be an electronic device 101 including a display 1430 at least a portion of which is slidable.

In an embodiment, the electronic device 101 may include a first housing 1421, a second housing 1423, and a display 1430. In an embodiment, although not shown in FIG. 14, the electronic device 101 may further include at least one of the components shown in FIG. 1.

In an embodiment, the second housing 1423 may be disposed to be slidable on the first housing 1421. In an embodiment, the display 1430 may be a flexible display. For example, a portion of a second area 1433 of the display 1430 may be transformed into a curved shape while the second housing 1423 slides on (or in) the first housing 1421.

In an embodiment, the display 1430 may be guided by a roller disposed in the second housing 1423 to extend while the second housing 1423 slides on (or in) the first housing 1421. For example, the partial area of the display 1430 may be exposed to the outside as the second housing 1423 slides on (or in) the first housing 1421.

In an embodiment, 1401 may indicate the state of the electronic device 101 in which the first area 1431 of the display 1430 is exposed to the outside. For example, 1401 may indicate the state of the electronic device 101 in which the second area 1433 of the display 1430 extending from the first area 1431 of the display 1430 and the third area 1435 of the display 1430 extending from the second area 1433 of the display 1430 are received (or inserted) in the second housing 1423, and the first area 1431 of the display 1430 is exposed to the outside. Hereinafter, the state of the electronic device 101 indicated by 1401 is, for example, denoted as a "first state of the electronic device 101" (or "first state").

In an embodiment, 1403 may indicate the state of the electronic device 101 in which the first area 1431 and second area 1433 of the display 1430 are exposed to the outside. For example, 1403 may indicate the state in which as the second housing 1423 slides on (or in) the first housing 1421, the second area 1433 of the display 1430, in addition to the first area 1431 of the display 1430, is exposed to the outside. Hereinafter, the state of the electronic device 101 indicated by 1403 is, for example, denoted as a "second state of the electronic device 101" (or "second state").

In an embodiment, 1405 may indicate a state of the electronic device 101 in which the first area 1431, second area 1433, and third area 1435 of the display 1430 are exposed to the outside. For example, 1005 may indicate the state in which as the second housing 1423 slides on (or in) the first housing 1421, the third area 1435 of the display 1430, in addition to the first area 1431 and second area 1433 of the display 1430, is exposed to the outside. Hereinafter, the state of the electronic device 101 as indicated by 1405 is, for example, denoted as a "third state of the electronic device 101" (or "third state").

In an embodiment, although not shown in FIG. 14, the electronic device 101 may further include a sensor (e.g., the sensor 330) capable of detecting the first state, second state, and third state of the electronic device 101. For example, the electronic device 101 may further include a sensor (e.g., hall sensor, mechanically operating switching element, or photo detector) capable of detecting an increase or decrease in the area of the display 1430 (or slide of the second housing 1423 on the first housing 1421). As an example, the electronic device 101 may further include at least one sensor capable of detecting the externally exposed area of the display 1430.

In an embodiment, although not shown in FIG. 14, there may be further included a sensor for detecting reception of an electronic pen in the electronic device 101 or separation (e.g., detachment) of the electronic pen from the electronic device 101.

In an embodiment, the examples of the operation of providing a screen by the electronic device 101 of FIG. 14 are at least partially identical or similar to the examples described in connection with FIGS. 10 to 13, and thus, a detailed description thereof is not repeated.

Figure 15:
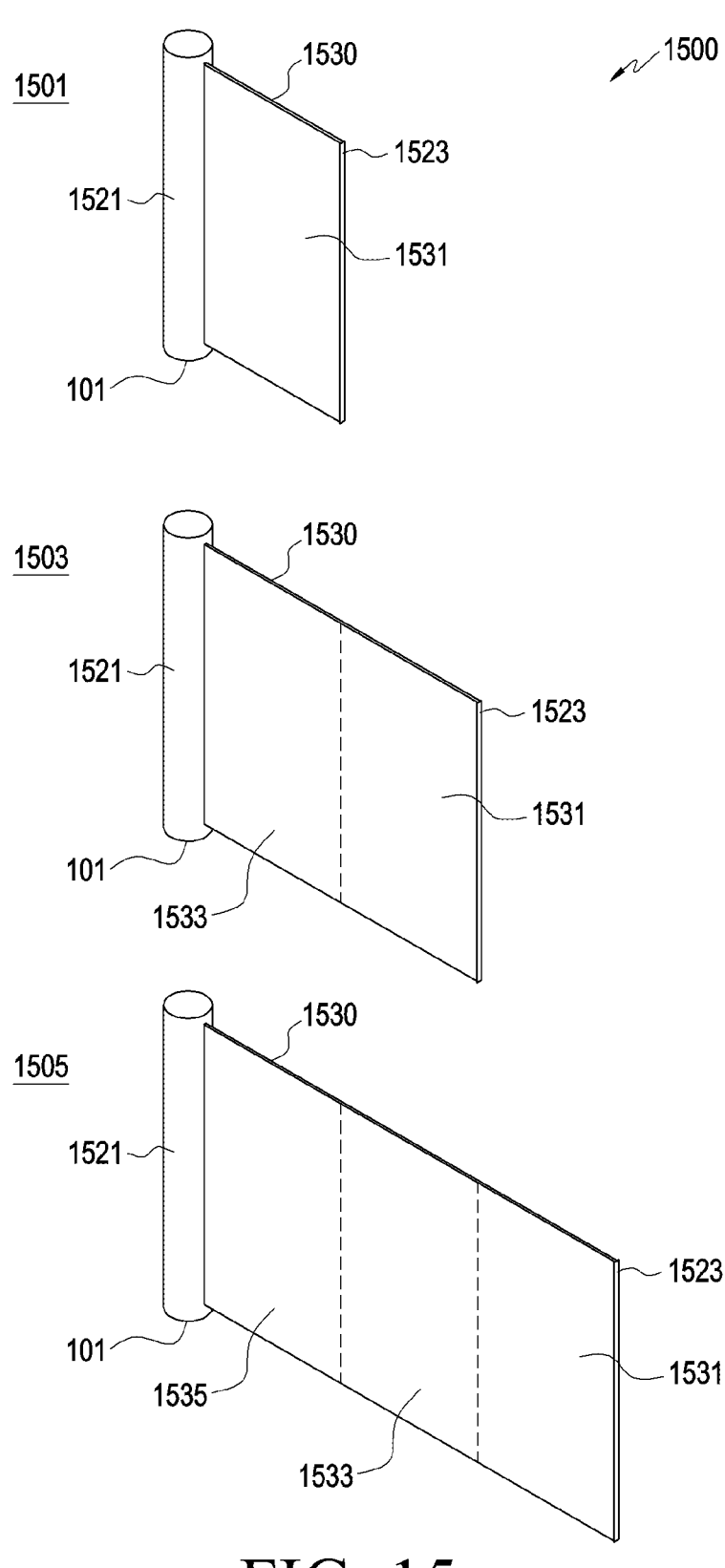
FIG. 15 is a diagram illustrating an example electronic device according to various embodiments.

FIG. 15 is a diagram 1500 illustrating an example electronic device 101 according to various embodiments.

Referring to FIG. 15, in an embodiment, the electronic device 101 may be an electronic device 101 at least a portion of the display 1530 of which is rollable.

In an embodiment, the electronic device 101 may include a housing 1521, a first member 1523, and a display 1530. In an embodiment, although not shown in FIG. 15, the electronic device 101 may further include at least one of the components shown in FIG. 1.

In an embodiment, the housing 1521 may allow the display 1530 to extend as the first member 1523 is moved by the user. For example, the housing 1521 may include a roller to allow the display 1530 to extend as the first member 1523 moves.

In an embodiment, the display 1530 may be a rollable display 1530. For example, at least a partial area of the display 1530 may be in a state of having transformed into a curved shape. In an embodiment, the display 1530 may be guided by the roller disposed in the housing 1521 to extend while the first member 1523 moves from the housing 1521. For example, as the first member 1523 is moved from the housing 1521, the externally exposed area of the display 1530 may be increased.

In an embodiment, 1501 may indicate the state of the electronic device 101 in which the first area 1531 of the display 1530 is exposed to the outside. For example, 1501 may indicate a state in which as the first member 1523 is moved with respect to the housing 1521, the first area 1531 of the display 1530 is exposed to the outside from the state in which the entire area of the display 1530 is received (or inserted) in the housing 1521. Hereinafter, the state of the electronic device 101 indicated by 1501 is, for example, denoted as a "first state of the electronic device 101" (or "first state").

In an embodiment, 1503 may indicate the state of the electronic device 101 in which the first area 1531 and second area 1533 of the display 1530 are exposed to the outside. For example, 1503 may indicate a state in which as the first member 1523 is moved with respect to the housing 1521, the second area 1533 of the display 1530, in addition to the first area 1531 of the display 1530, is exposed to the outside.

Hereinafter, the state of the electronic device 101 indicated by 1503 is, for example, denoted as a "second state of the electronic device 101" (or "second state").

In an embodiment, 1505 may indicate a state of the electronic device 101 in which the first area 1531, second area 1533, and third area 1535 of the display 1530 are exposed to the outside. For example, 1505 may indicate a state in which as the first member 1523 is moved with respect to the housing 1521, the second area 1533 and third area 1535 of the display 1530, in addition to the first area 1531 of the display 1530, is exposed to the outside. Hereinafter, the state of the electronic device 101 as indicated by 1405 is, for example, denoted as a "third state of the electronic device 101" (or "third state").

In an embodiment, although not shown in FIG. 15, the electronic device 101 may further include a sensor capable of detecting the first state, second state, and third state of the electronic device 101. For example, the electronic device 101 may further include a sensor (e.g., the sensor 330) capable of detecting an increase or decrease in the externally exposed area of the display 1530. As an example, the electronic device 101 may further include at least one sensor capable of detecting the externally exposed area of the display 1530.

In an embodiment, although not shown in FIG. 15, there may be further included a sensor for detecting reception of an electronic pen in the electronic device 101 or separation (e.g., detachment) of the electronic pen from the electronic device 101.

In an embodiment, the examples of the operation of providing a screen by the electronic device 101 of FIG. 15 are at least partially identical or similar to the examples described in connection with FIGS. 10 to 13, and thus, a detailed description thereof is not repeated.

In an embodiment, although not shown in the disclosure, the electronic device 101 may further include other various states depending on the externally exposed area of the display without being limited to the first state, second state, and third state of the electronic device 101. For example, the electronic device 101 may include more subdivided states according to an increase or decrease in the externally exposed area of the display.

According to various embodiments of the disclosure, an electronic device 101 may include a housing 1021 and 1023, a display 1030 with an externally exposed area extendable according to movement through the housing 1021 and 1023, at least one sensor 330, a communication module 310, a processor 350 operatively connected with the display 1030, the at least one sensor 330, and the communication module 310, and a memory 340 operatively connected with the processor 350. The memory 340 may store instructions that, are configured to, when executed, enable the processor 350 to detect external exposure of an area of the display 1030 by a designated area or more through the at least one sensor 330, upon detecting the external exposure of the area of the display 1030 by the designated area or more, identify whether there is an external electronic device communicatively connected or communicatively connectable to the electronic device 101 through the communication module 310, when there is the external electronic device communicatively connected or communicatively connectable to the electronic device 101, identify a type of the external electronic device, and display a screen corresponding to a first mode or a screen corresponding to a second mode different from the first mode through the display 1030 based on the type of the external electronic device.

According to various embodiments, the instructions may enable the processor 350 to, when the type of the external electronic device is an external input device, display the screen corresponding to the second mode through the area of the display 1030.

Further, the structure of the data used in embodiments of the disclosure may be recorded in a computer-readable recording medium via various means. The computer-readable recording medium includes a storage medium, such as a magnetic storage medium (e.g., a ROM, a floppy disc, or a hard disc) or an optical reading medium (e.g., a CD-ROM or a DVD).

While the disclosure has been illustrated and described with reference to various example embodiments, it will be understood that the various example embodiments are intended to be illustrative, not limiting. It will be further understood by one skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. An electronic device, comprising:
a housing including a first housing, a second housing, and a third housing;
a hinge unit comprising a first hinge configured to rotate the first housing and the second housing and a second hinge configured to rotate the second housing and the third housing;
a display including a first area disposed on the first housing, a second area disposed on the second housing, and a third area disposed on the third housing;
at least one sensor;
a communication module including communication circuitry;
at least one processor operatively connected with the display, the at least one sensor, and the communication module; and
a memory operatively connected with the processor, wherein the memory stores instructions that are configured to, when executed, enable the at least one processor to:
detect a change of a state of the electronic device from a first state or a second state to a third state in which the second housing is unfolded about the hinge unit at a designated angle or more from the first housing and the third housing, through the at least one sensor;
based on detecting the change of the state of the electronic device to the third state, identify whether an external electronic device is communicatively connected or communicatively connectable to the electronic device through the communication module;
based on an external electronic device being communicatively connected or communicatively connectable to the electronic device, identify a type of the external electronic device; and
display a screen corresponding to a first mode or a screen corresponding to a second mode different from the first mode, through the first area, the second area, and the third area of the display, based on the type of the external electronic device.

2. The electronic device of claim 1, wherein the instructions are configured to enable the at least one processor to, based on the type of the external electronic device being an external input device, display the screen corresponding to the second mode through the first area, the second area, and the third area of the display.

3. The electronic device of claim 2, wherein the instructions are configured to enable the at least one processor to, based on the type of the external electronic device being the external input device, and an input for displaying the screen corresponding to the second mode being received, display the screen corresponding to the second mode, through the first area, the second area, and the third area of the display.

4. The electronic device of claim 1, wherein the instructions are configured to enable the at least one processor to:
based on the external electronic device communicatively connected to the electronic device being absent, or a designated external electronic device being not communicatively connected to the electronic device, display the screen corresponding to the first mode through the first area, the second area, and the third area of the display.

5. The electronic device of claim 1, wherein the instructions are configured to enable the at least one processor to:
based on detecting the change of the state of the electronic device to the third state, identify the external electronic device communicatively connectable to the electronic device through the communication module; and
communicatively connect the external electronic device to the electronic device through the communication module.

6. The electronic device of claim 1, wherein the instructions are configured to enable the at least one processor to:
detect a change of the state of the electronic device to a unfolded state in which the first housing and the second housing are at a designated first angle or more about the first hinge unit, and the second housing and the third housing are unfolded about the second hinge unit at a designated second angle or more through the at least one sensor;
based on detecting the change of the state of the electronic device to the unfolded state, identify whether an external electronic device is communicatively connected to the electronic device through the communication module;
based on an external electronic device being communicatively connected to the electronic device, identify a type of the external electronic device; and
display the screen corresponding to the first mode or the screen corresponding to the second mode different from the first mode, through the second area and the third area of the display, based on the type of the external electronic device.

7. The electronic device of claim 6, wherein the screen corresponding to the first mode includes a plurality of third icons, different from the plurality of first icons and the plurality of second icons, and an icon corresponding to an application related to the external electronic device.

8. The electronic device of claim 1, wherein the first state is a state in which the first area faces in a direction opposite to a direction in which the second area faces, and the second area and the third area face each other, and the second state is a state in which the first area faces in the direction opposite to the direction in which the second area faces, and the second area and the third area face in the same direction, and wherein the instructions are configured to enable the at least one processor to:
display a plurality of first icons through the first area in the first state;

detect a change of the state of the electronic device from the first state to the second state through the at least one sensor; and
display a plurality of second icons at a second resolution higher than a first resolution of the plurality of first icons or display the plurality of second icons arranged by a distance longer than a distance between the plurality of first icons, through the second area and the third area, in the second state.

9. The electronic device of claim 1, wherein the first mode is a tablet mode, and the second mode is a desktop mode.

10. A method for providing a screen using a flexible display by an electronic device, the method comprising:
detecting a change of a state of the electronic device from a first state or a second state to a third state in which a second housing is unfolded about a hinge unit at a designated angle or more from a first housing and a third housing, through at least one sensor of the electronic device;
based on detecting the change of the state of the electronic device to the third state, identifying whether an external electronic device is communicatively connected or communicatively connectable to the electronic device through a communication module of the electronic device;
based on an external electronic device being communicatively connected or communicatively connectable to the electronic device, identifying a type of the external electronic device; and
displaying a screen corresponding to a first mode or a screen corresponding to a second mode different from the first mode, through a first area of the display, disposed on the first housing, a second area of the display, disposed on the second housing, and a third area of the display, disposed on the third housing, based on the type of the external electronic device.

11. The method of claim 10, wherein displaying the screen corresponding to the first mode or the screen corresponding to the second mode different from the first mode includes, based on the type of the external electronic device being an external input device, displaying the screen corresponding to the second mode through the first area, the second area, and the third area of the display.

12. The method of claim 10, wherein displaying the screen corresponding to the first mode or the screen corresponding to the second mode different from the first mode includes, based on the type of the external electronic device being the external input device, and an input for displaying the screen corresponding to the second mode being received, displaying the screen corresponding to the second mode, through the first area, the second area, and the third area of the display.

13. The method of claim 10, wherein displaying the screen corresponding to the first mode or the screen corresponding to the second mode different from the first mode includes, based on the external electronic device communicatively connected to the electronic device being absent, or a designated external electronic device not being communicatively connected to the electronic device, displaying the screen corresponding to the first mode through the first area, the second area, and the third area of the display.

14. The method of claim 10, further comprising:
based on detecting the change of the state of the electronic device to the third state, identifying the external electronic device communicatively connectable to the electronic device through the communication module; and communicatively connecting the external electronic device to the electronic device through the communication module.

15. The method of claim 10, further comprising:

detecting a change of the state of the electronic device to a unfolded state in which the first housing and the second housing are at a designated first angle or more about a first hinge unit, and the second housing and the third housing are unfolded about a second hinge unit at a designated second angle or more through the at least one sensor;

based on detecting the change of the state of the electronic device to the unfolded state, identifying whether an external electronic device is communicatively connected to the electronic device through the communication module;

based on an external electronic device being communicatively connected to the electronic device, identifying a type of the external electronic device; and displaying the screen corresponding to the first mode or the screen corresponding to the second mode different from the first mode, through the second area and the third area of the display, based on the type of the external electronic device.

16. The method of claim 10, wherein the first state is a state in which the first area faces in a direction opposite to a direction in which the second area faces, and the second area and the third area face each other, and the second state is a state in which the first area faces in the direction opposite to the direction in which the second area faces, and the second area and the third area face in the same direction, wherein the method further comprises:

displaying a plurality of first icons through the first area in the first state;

detecting a change of the state of the electronic device from the first state to the second state through the at least one sensor; and displaying a plurality of second icons at a second resolution higher than a first resolution of the plurality of first icons or display the plurality of second icons arranged by a distance longer than a distance between the plurality of first icons, through the second area and the third area, in the second state.

17. The method of claim 16, wherein the screen corresponding to the first mode includes a plurality of third icons, different from the plurality of first icons and the plurality of second icons, and an icon corresponding to an application related to the external electronic device.

18. The method of claim 10, wherein the first mode is a tablet mode, and the second mode is a desktop mode.

19. An electronic device, comprising:

a housing;

a display with an externally exposed area extendable according to movement through the housing;

at least one sensor;

a communication module including communication circuitry;

a processor operatively connected with the display, the at least one sensor, and the communication module; and a memory operatively connected with the at least one processor, wherein the memory stores instructions that are configured to, when executed, enable the at least one processor to:

detect external exposure of an area of the display by a designated area or more through the at least one sensor;

based on detecting the external exposure of the area of the display by the designated area or more, identify whether an external electronic device is communicatively connected or communicatively connectable to the electronic device through the communication module;

based on an external electronic device being communicatively connected or communicatively connectable to the electronic device, identify a type of the external electronic device; and display a screen corresponding to a first mode or a screen corresponding to a second mode different from the first mode through the display based on the type of the external electronic device.

20. The electronic device of claim 19, wherein the instructions are configured to enable the at least one processor to, based on the type of the external electronic device being an external input device, display the screen corresponding to the second mode through the area of the display.

* * * * *